(12) United States Patent
Beregi

(10) Patent No.: US 8,483,895 B1
(45) Date of Patent: Jul. 9, 2013

(54) TRANSPORTATION SYSTEM, SYSTEM COMPONENTS AND PROCESS

(76) Inventor: James J. Beregi, Tuscon, AZ (US)

( * ) Notice: Subject to any disclaimer, the term of this patent is extended or adjusted under 35 U.S.C. 154(b) by 530 days.

(21) Appl. No.: 12/712,099

(22) Filed: Feb. 24, 2010

Related U.S. Application Data

(60) Provisional application No. 61/155,486, filed on Feb. 25, 2009.

(51) Int. Cl.
| | |
|---|---|
| *B61L 27/00* | (2006.01) |
| *B61L 27/0005* | (2006.01) |
| *B61L 3/16* | (2006.01) |
| *B61L 3/20* | (2006.01) |
| *B61L 3/24* | (2006.01) |

(52) U.S. Cl.
USPC ............... 701/20; 246/182 R; 246/182 C

(58) Field of Classification Search
USPC ............ 701/19, 20, 24; 104/88.01–88.04, 104/25, 88.1–88.4, 287–289, 293, 295; 246/2 R, 246/182 R, 182 C, 187 R, 167 R
See application file for complete search history.

(56) References Cited

U.S. PATENT DOCUMENTS

| | | | |
|---|---|---|---|
| 2,188,293 | A | 1/1940 | Williams |
| 3,029,893 | A | 4/1962 | Mountjoy |
| 3,118,392 | A | 1/1964 | Zimmerman |
| 3,440,600 | A | 4/1969 | Frech et al. |
| 3,532,934 | A | 10/1970 | Ballman |
| 3,570,407 | A | 3/1971 | Burch |
| 3,609,676 | A | 9/1971 | Jauquet et al. |
| 3,628,462 | A | 12/1971 | Holt |
| 3,636,508 | A | 1/1972 | Ogilvy et al. |
| 3,638,751 | A | 2/1972 | Moll et al. |

(Continued)

FOREIGN PATENT DOCUMENTS

| | | |
|---|---|---|
| DE | 1413005 B2 | 4/1972 |
| DE | 235786 A3 | 5/1986 |

(Continued)

OTHER PUBLICATIONS

Larson et al. "Autonomous Navigation and Obstacle Avoidance for Unmanned Surface Vehicles". SPIE Unmanned Systems Technology VIII, Orlando, FL, Apr. 17-20, 2006.

(Continued)

*Primary Examiner* — John Q Nguyen
*Assistant Examiner* — Michael Whalen

(57) ABSTRACT

New and useful system, components and methods are provided for a transportation system in which one or more vehicles are moved between at least a pair of stations along a guideway that extends between the pair of stations. The vehicle is propelled along the guideway while one or more signals are transmitted that can be used for controlling the speed of the vehicle and the spacing between the vehicle and other vehicles on the guideway. A digital signal that decodes into a sync signal component and a spacing signal component is transmitted along the guideway, where the difference between the period of the sync and spacing signal components determines the predetermined speed of the vehicles moving along the guideway. Each vehicle has a virtual scan window, based on the actual speed of the vehicle, that is configured to follow the spacing signal component in a manner such that the relation of a predetermined point on the virtual scan window to the spacing signal component determines whether the vehicle is maintaining the predetermined speed or whether the speed of the vehicle needs to be adjusted to maintain the predetermined speed and spacing.

5 Claims, 21 Drawing Sheets

U.S. PATENT DOCUMENTS

| | | | | |
|---|---|---|---|---|
| 3,648,228 | A | 3/1972 | Perry | |
| 3,668,624 | A | 6/1972 | Spaulding | |
| 3,675,584 | A | 7/1972 | Hall | |
| 3,679,874 | A | 7/1972 | Fickenscher | |
| 3,687,082 | A * | 8/1972 | Burke, Jr. | 104/298 |
| 3,768,417 | A | 10/1973 | Thornton et al. | |
| 3,772,640 | A | 11/1973 | Auer, Jr. et al. | |
| 3,786,411 | A | 1/1974 | Kurauchi et al. | |
| 3,790,779 | A | 2/1974 | Paddison | |
| 3,790,780 | A | 2/1974 | Helmcke et al. | |
| 3,858,521 | A | 1/1975 | Atherton | |
| 3,906,436 | A | 9/1975 | Kurauchi et al. | |
| 3,927,735 | A | 12/1975 | Miericke et al. | |
| 4,023,753 | A | 5/1977 | Dobler | |
| 4,061,089 | A | 12/1977 | Sawyer | |
| 4,132,175 | A | 1/1979 | Miller et al. | |
| 4,361,202 | A * | 11/1982 | Minovitch | 180/168 |
| 4,441,604 | A | 4/1984 | Schlig et al. | |
| 4,522,128 | A | 6/1985 | Anderson | |
| 4,665,830 | A | 5/1987 | Anderson et al. | |
| 4,666,829 | A | 5/1987 | Glenner | |
| 4,670,845 | A | 6/1987 | Etoh | |
| 4,671,185 | A | 6/1987 | Anderson et al. | |
| 4,726,299 | A | 2/1988 | Anderson | |
| 4,776,464 | A | 10/1988 | Miller et al. | |
| 4,794,865 | A | 1/1989 | Lindberg | |
| 4,914,539 | A | 4/1990 | Turner et al. | |
| 4,974,259 | A | 11/1990 | Takahashi et al. | |
| 5,063,857 | A * | 11/1991 | Kissel, Jr. | 104/88.04 |
| 5,108,052 | A | 4/1992 | Malewicki et al. | |
| 5,251,563 | A | 10/1993 | Staehs et al. | |
| 5,267,514 | A | 12/1993 | Staehs et al. | |
| 5,277,124 | A | 1/1994 | DiFonso et al. | |
| 5,277,125 | A | 1/1994 | DiFonso et al. | |
| 5,293,308 | A | 3/1994 | Boys et al. | |
| 5,305,693 | A | 4/1994 | Johnson et al. | |
| 5,325,974 | A | 7/1994 | Staehs | |
| 5,369,591 | A * | 11/1994 | Broxmeyer | 701/301 |
| 5,377,106 | A | 12/1994 | Drunk et al. | |
| 5,400,864 | A | 3/1995 | Winner et al. | |
| 5,409,095 | A | 4/1995 | Hoshi et al. | |
| 5,435,429 | A | 7/1995 | Van Den Goor | |
| 5,473,233 | A * | 12/1995 | Stull et al. | 318/587 |
| 5,590,604 | A * | 1/1997 | Lund | 104/88.04 |
| 5,595,121 | A * | 1/1997 | Elliott et al. | 104/53 |
| 5,794,535 | A * | 8/1998 | Pardes | 104/130.07 |
| 5,845,583 | A | 12/1998 | Jensen | |
| 5,923,270 | A | 7/1999 | Sampo et al. | |
| 5,977,869 | A | 11/1999 | Andreas | |
| 6,011,508 | A | 1/2000 | Perreault et al. | |
| 6,129,025 | A * | 10/2000 | Minakami et al. | 104/88.01 |
| 6,169,954 | B1 * | 1/2001 | McCrary | 701/117 |
| 6,198,994 | B1 * | 3/2001 | McCrary | 701/24 |
| 6,237,504 | B1 | 5/2001 | Tanahashi et al. | |
| 6,249,724 | B1 * | 6/2001 | McCrary | 701/24 |
| 6,253,128 | B1 | 6/2001 | Kageyama et al. | |
| 6,263,799 | B1 * | 7/2001 | Pardes | 104/28 |
| 6,269,291 | B1 | 7/2001 | Segeren | |
| 6,276,542 | B1 * | 8/2001 | McCrary | 213/75 R |
| 6,311,120 | B1 | 10/2001 | Asada | |
| 6,314,890 | B1 | 11/2001 | Geldbaugh | |
| 6,317,073 | B1 | 11/2001 | Tamatsu et al. | |
| 6,318,274 | B1 | 11/2001 | Park | |
| 6,421,600 | B1 | 7/2002 | Ross | |
| 6,577,933 | B2 | 6/2003 | How | |
| 6,668,729 | B1 | 12/2003 | Richards | |
| 6,721,985 | B2 * | 4/2004 | McCrary | 14/77.1 |
| 7,248,962 | B2 | 7/2007 | Heinrichs-Bartscher | |
| 7,286,934 | B2 * | 10/2007 | Gaegauf et al. | 701/301 |
| 7,302,319 | B2 * | 11/2007 | Wu | 701/19 |
| 7,561,948 | B2 * | 7/2009 | Gaegauf et al. | 701/19 |
| 7,663,490 | B2 | 2/2010 | Dishongh | |
| 7,711,485 | B2 | 5/2010 | Matsumoto | |
| 7,945,357 | B2 * | 5/2011 | Kubo | 701/19 |
| 7,966,943 | B2 * | 6/2011 | Brigham | 104/130.07 |
| 8,140,202 | B2 * | 3/2012 | Dibble et al. | 701/20 |
| 8,145,368 | B2 * | 3/2012 | Won et al. | 701/20 |
| 2004/0225421 | A1 * | 11/2004 | Wu | 701/19 |
| 2006/0201376 | A1 * | 9/2006 | Brigham | 104/130.07 |
| 2007/0107966 | A1 | 5/2007 | Brunner et al. | |
| 2011/0125350 | A1 * | 5/2011 | Won et al. | 701/20 |
| 2011/0196561 | A1 * | 8/2011 | Jorgensen | 701/23 |

FOREIGN PATENT DOCUMENTS

| | | |
|---|---|---|
| DE | 4118205 A1 | 12/1992 |
| DE | 4241677 A1 | 12/1992 |
| DE | 19535856 A1 | 3/1997 |
| EP | 0229669 A2 | 7/1987 |
| EP | 89850067.3 | 2/1989 |
| EP | 0482424 B1 | 10/1996 |
| EP | 1418128 A1 | 5/2004 |
| JP | 0129336 | 10/1994 |
| JP | 10161745 | 6/1998 |
| JP | 11039586 | 2/1999 |
| JP | 2006176069 | 7/2006 |
| SU | 1140212 | 2/1985 |
| WO | 95/21405 A2 | 8/1995 |

OTHER PUBLICATIONS

Litzengerger et, al, Estimation of Vehicle Speed Based on Asynchronous Data from a silicon Retina Optical Sensor, Proceedings of the IEEE ITSC 2006.

* cited by examiner

Metropolitan Area
Gideway Grid 100

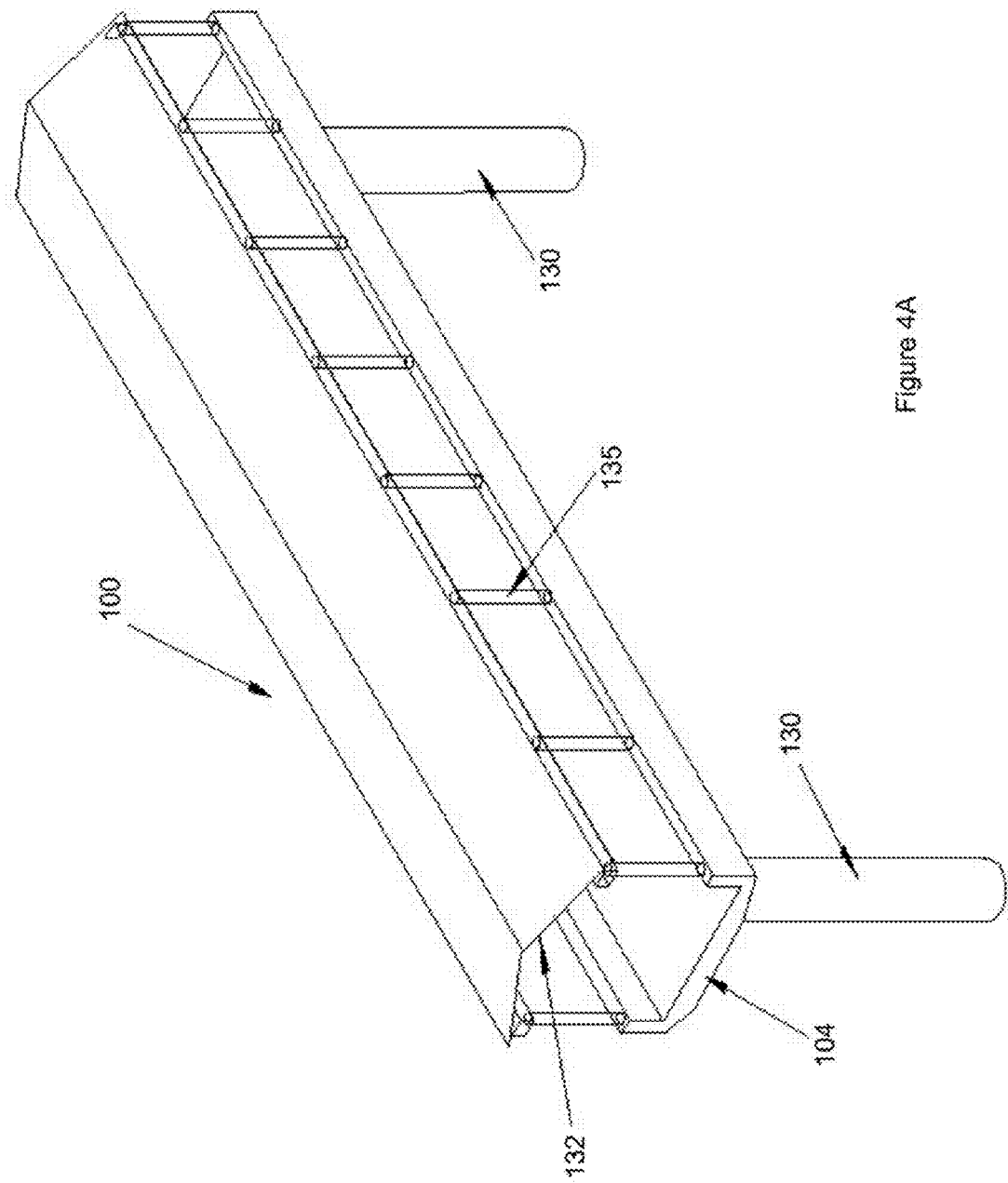

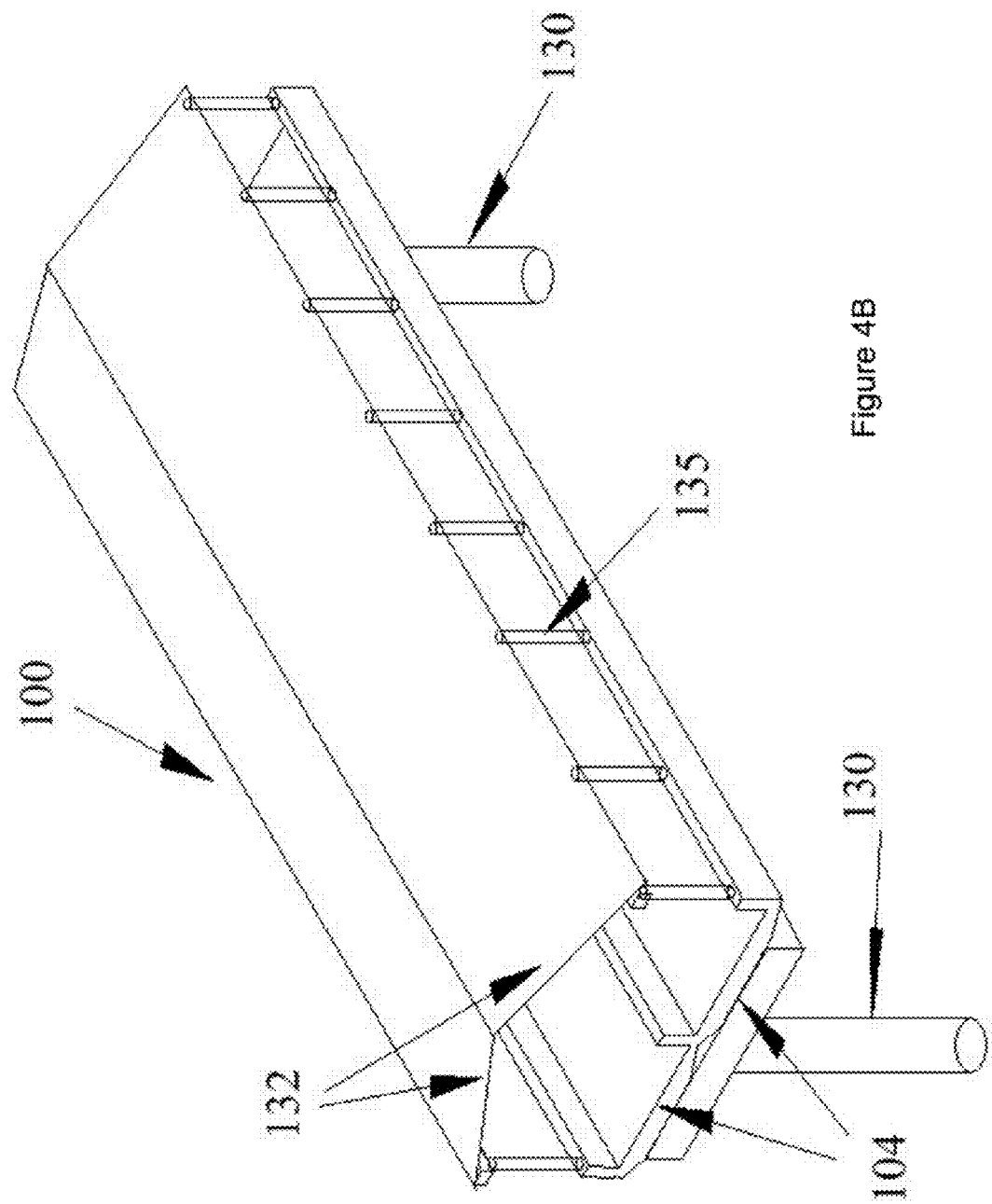

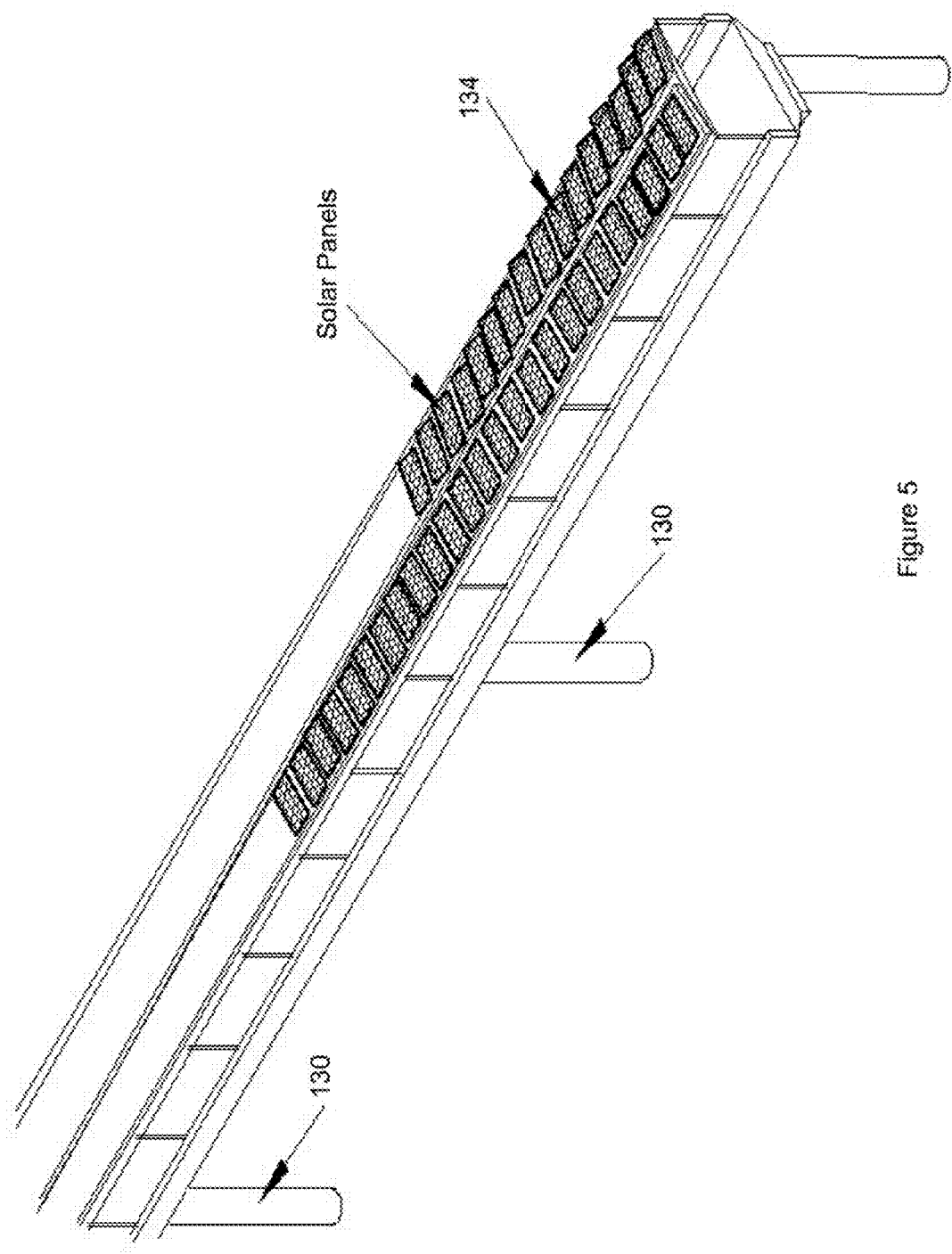

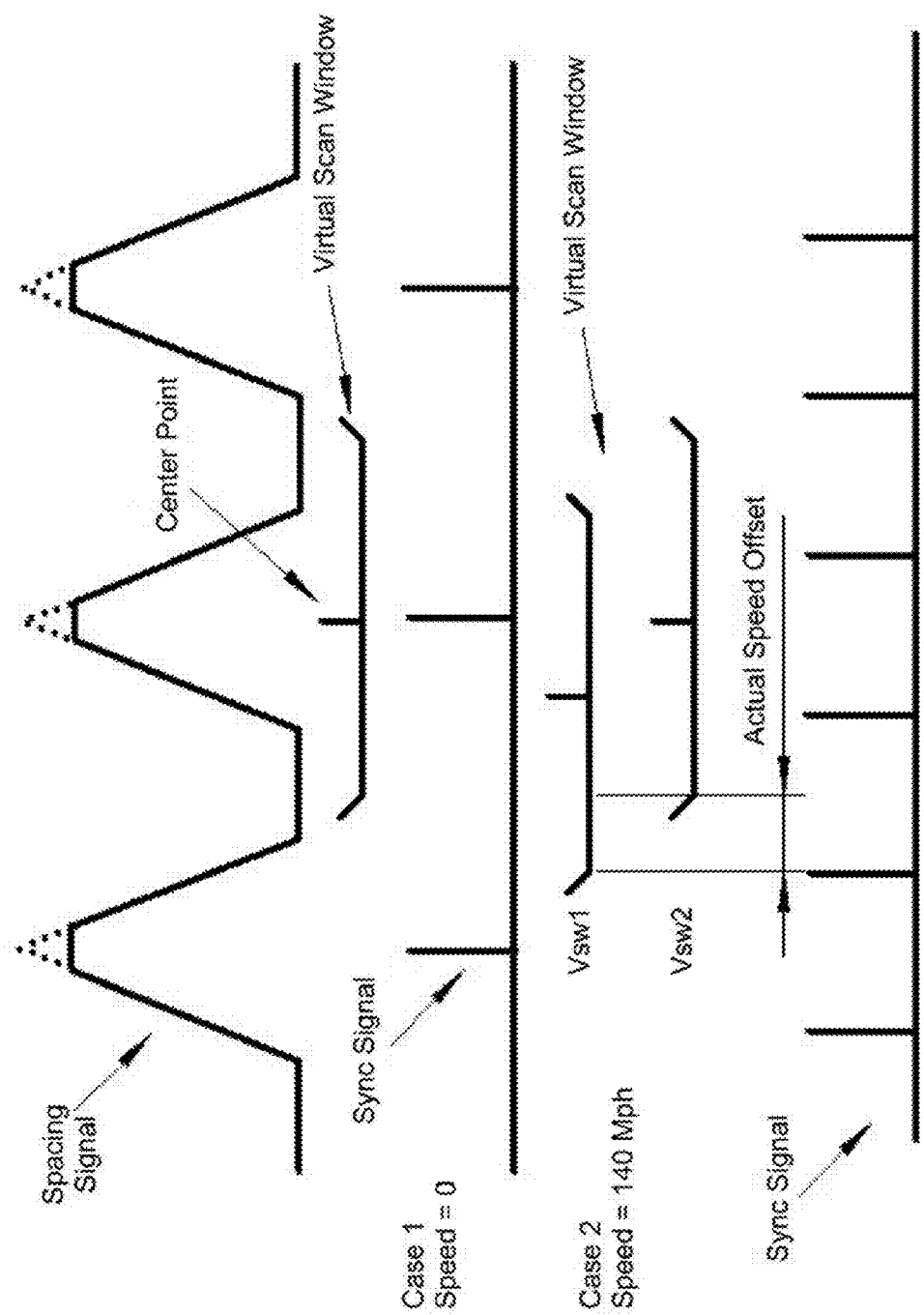

TRANSPORTATION SYSTEM, SYSTEM COMPONENTS AND PROCESS

RELATED APPLICATION/CLAIM OF PRIORITY

This application is related to and claims priority from Provisional Application Ser. No. 61/155,486, filed Feb. 25, 2009, and entitled Transportation system, system components and process, which provisional application is incorporated by reference herein.

BACKGROUND

The present invention relates to a new and useful transportation system, system components, and process.

Current mass transit or public transportation systems tend to be closed loop, scheduled systems. That is, they provide transportation from one point in the system to another on a scheduled basis. Passengers must follow a schedule and stop at locations between their starting point and their end point. Passengers must also ride in a closed vehicle with all other passengers wishing to travel that route at that time.

Schedules are built based on complex formulas factoring the number and capacity of vehicles, and the expected number of passengers by time of day. The cost of the vehicles and the fuel to run them must be balanced against the expected ridership. Based on the results of the analysis a schedule is created. Often the resulting schedule provides transportation no more the a few times a day if the route is long. Short routes are more of a problem if the traffic is high, transport is required every few minutes, demanding more vehicles which will sit idle when demand is low. Demand for transport varies by time so often schedules change by day of week and time of day.

Because of the compromises made in designing and implementing closed, scheduled mass transit systems, such systems are used only by those who have no other choice. Ridership then is primarily determined by population density and the availability of other modes of travel. Therefore, most public transportation systems are busy for only short periods of time and the facilities utilization is too low to generate revenue sufficient to meet the cost of construction or even the operating costs.

In addition, in addressing issues involved in freeway traffic applicant noted there is an inherent instability in a system of independent vehicles all trying to maintain a relative constant speed and distance. Instability waves develop which grow in intensity over time and with the number of vehicles. This results in slow stop and go travel as traffic volume grows. Also, city traffic congestion can gridlock as high volume intersections backup into each other causing a virtually complete stand still in the movement of vehicles. Current city streets and freeways have a volume limit which is often exceeded during "Rush Hour" causing excessive delays and lost time. Clearly a new transportation method is needed that preserves the freedom of travel now enjoyed by driving one's own vehicle, avoids traffic congestion and improves travel safety.

SUMMARY OF THE PRESENT INVENTION

An objective of the present invention is to create a new paradigm in transportation between at least 2 locations, that includes a new system concept, new and useful components for such a system, and a new and useful method for carrying out the new paradigm.

In the implementation of its concepts, the present invention provides a number of new and useful system, components and methods for a transportation system in which vehicles travel along a guideway between the locations (that can be e.g., exit/entrance stations, interchanges where a vehicle changes direction to another guideway, etc.).

A new and useful control strategy is an important aspect of the apparatus, system and method of the present invention. The control strategy of the present invention avoids the instability problem by having each vehicle track a control signal in a manner that enables the speed and spacing of vehicles on the guideway (and at stations and interchanges) to be effectively controlled.

In one of its features, the present invention provides new and useful system concepts for maintaining speed and spacing between vehicles moving along a guideway. An automated system according to the principles of the present invention comprises a guideway with a plurality of entrance/exit stations, each of which has a server that is configured to communicate with one or more of a plurality of other stations and with a plurality of vehicles on the guideway for maintaining speed and spacing between vehicles moving along the guideway. The guideway has a plurality of rails configured to carry electrical power and the server configured to transmit control signals to vehicles on the guideway; and each of the plurality of vehicles comprises an electric vehicle configured to operate on the guideway. Each electric vehicle has (a) a receiver process that decodes a control signal (e.g. a digital control signal) into a sync signal component and a spacing signal component, where the difference between the period of the sync and spacing signal components determines the predetermined speed of the vehicles moving along the guideway; and (b) a signal processor function that provides a virtual scan window, based on the actual speed of the vehicle, that follows the spacing signal component that is used to maintain vehicle spacing in a manner such that the relation of a predetermined point in the virtual scan window to the spacing signal component determines whether the vehicle is maintaining the predetermined speed or whether the speed of the vehicle needs to be adjusted to maintain the predetermined speed and spacing.

In a preferred version of this feature, the digital signal is transmitted along a guiderail, and is in circuit communication with a server on a vehicle moving along the guideway, via a sensor that can be placed in circuit communication with the guiderail. The server is configured to decode the digital signal into the sync signal component and the spacing signal component, and to produce the virtual scan window, based on the actual speed of the vehicle, that is configured to follow the spacing signal. Moreover, rail structure extends along the side(s) of the guideway and is configured to (i) provide a circuit connection with a source of power for the vehicle, to propel the vehicle along the guideway, and (ii) provide a circuit communication to a source of a control signal for the vehicle, as the vehicle is traveling along the guideway. The vehicle has at least one electrical connector that can be selectively moved into contact with the rail structure to (i) establish and provide the vehicle with circuit connection to a source of motive power for the vehicle, to propel the vehicle along the guideway, and (ii) provide the vehicle with circuit connection to the server that processes the digital signal. In addition, the vehicle has sensor structure that interacts with the pair of rails to produce electrical guidance that can be used in orienting (e.g. steering) the vehicle as the vehicle is moving along the guideway.

In this application, reference to a "server" means an industry standard computer with one or more processors and one or more communication interfaces, that is configured to run multiple programs or processes.

In a method according to the principles of the present invention, one or more electric vehicles move between at least a pair of locations (e.g. exit/entrance stations), and a guideway that extends between the pair of locations for guiding the vehicles between the pair of locations. Each vehicle is propelled along the guideway while one or more signals are transmitted that can be used for controlling the speed of the vehicle and the spacing between the vehicle and other vehicles on the guideway.

In a preferred method, according to the principles of the present invention, the one or more signals are transmitted along the guideway, and sensed by the vehicle as it is traveling along the guideway. The one or more signals are transmitted along one or both of a pair of rails that extend along the sides of the guideway. The vehicle is configured to sense the transmitted signals by a sensor that contacts one rail during the vehicle's travel between the locations.

Also, in a preferred method, according to the principles of the present invention, the signals that are used to control the speed and spacing of vehicles on the guideway between the pair of locations are transmitted from the one of the locations toward which the vehicle is traveling along the guideway. A signal that is transmitted from the one of the locations is electrically isolated from another digital signal that is transmitted from another location that is downstream of the one location, where the said digital signal can be used to control the speed and spacing of vehicles traveling on the guideway between the one location to the said other location. Rails are provided on both sides of the vehicle as it exits or enters the guideway at one of the locations, and an exit/enter digital signal is transmitted along one of the rails as the vehicle is exiting or entering the guideway at the one of the locations. The vehicle is configured to engage the one of the rails to sense the exit/enter digital signal, and the exit/enter digital signal is configured to be decoded and used to control the speed and spacing of vehicles exiting or entering the guideway at the location. Preferably, a sensor on the opposite side of the vehicle from the sensor that contacts the guideway rail while the vehicle is on the guideway engages the rail at the exit/entrance location and sense(s) the exit/enter digital signal.

Still further, in a preferred method, according to the principles of the present invention, digital signals transmitted along any of the rails can be transmitted on a selected channel at a selected one of a plurality of frequencies. Each transmitted digital signal is configured such it can be decoded into a sync signal component and a spacing signal component, where the difference between the period of the sync and spacing signal components determines the predetermined speed of vehicles moving along the guideway. Each vehicle has a process that produces a virtual scan window, based on the actual speed of the vehicle, that is configured to follow the spacing signal component in a manner such that the relation of a predetermined point on the scan window to the spacing signal component determines whether the vehicle is maintaining the predetermined speed or whether the speed of the vehicle needs to be adjusted to maintain the predetermined speed. The process of maintaining the speed by design also maintains the spacing.

Additionally, the vehicle has a pair of sensors that are configured to selectively engage rails attached to the guideway on either sides of the vehicles and to provide data that can be used to produce electrical guidance for use in orienting the vehicle as the vehicle is moving along the guideway. Moreover, a master control center is provided for the guideway, and produces one or more predetermined master signals that are used by each location along the guideway to synchronize the signals that originate at such location for use by vehicles traveling along the guideway toward such location.

Thus, the present invention provides a new and useful paradigm for high speed transportation between 2 locations. According to that paradigm, a guideway is provided that comprises an elevated roadway. A vehicle enters a guideway at one location (an entrance location), and can travel along the guideway at high speed to another location (an exit location). At the exit location, the vehicle can exit the guideway, and transform to a mode in which the vehicle becomes a more standard vehicle that can be driven along streets at the exit location. The vehicle can then reenter the guideway at the exit location, and be transported along the guideway back to the entrance location. Thus, the vehicle is dual mode, in that it functions in a special way as it travels along the guideway, and is transformed to a manual state in which it can be driven along the streets at one of the locations. The mode of transportation is either manual driver controlled when on roads and automated when traveling on the powered elevated roadways.

One the new and useful aspects of the invention is the manner in which vehicles moving along the guideway are controlled, so that they move at high speed along the guideway, while their speed and spacing are synchronized and controlled. A transmitted signal is used to enable the vehicle spacing and speeds to be synchronized and controlled. The transmitted signal is communicated in a manner such that it can be received by each vehicle moving along the guideway. The transmitted signal decodes into a sync signal component and a spacing signal component, where the difference between the period of the sync and spacing signal components determines the predetermined speed of the vehicles and by design the spacing of the vehicles moving along the guideway. Each vehicle has a process that produces a virtual scan window, based on the actual speed of the vehicle, that is configured to follow the spacing signal component in a manner such that the relation of a predetermined point on the scan window to the spacing signal component determines whether the vehicle is maintaining the predetermined speed or whether the speed of the vehicle needs to be adjusted to maintain the predetermined speed and spacing.

When a vehicle is preparing to enter the guideway, the electronic sync-signal concept establishes the spacing and also enables the vehicle to get "up to speed" as it enters the guideway. There are broadcast signals at each entrance/exit location that are decoded into sync and speed signals by a server on a vehicle that is exiting or entering the guideway. Once the vehicle enters the guideway, the sync and spacing signals (which are preferably synchronized in both frequency and phase) enables the vehicle to maintain speed and spacing. Currently, it is contemplated that as a vehicle enters the guideway, there would be a "hand off" to the guideway transmitted signal tracking function, to enable the vehicle to track a transmitted signal between entrance/exit locations along the guideway. Thus, each station would have an entry and exit broadcast signal that the vehicle would track, and once the vehicle enters the guideway, it will track another transmitted signal between the stations.

The present invention also provides a new and useful exit strategy for vehicles exiting the guideway at a station, which is designed to eliminate the risk of a backup of a large number of vehicles exiting the guideway at the station from interfering with normal travel of other vehicles along the guideway. An exit path is provided at the station that enables vehicles to exit the guideway at speeds comparable to the speeds at which they were traveling along the guideway. The exit strategy of the present invention establishes exit signal control of vehicles entering the exit path at the station that (i) groups the vehicles exiting the guideway into groups of predetermined numbers of vehicles, (ii) directs groups of vehicles along one of two exit paths at the station, initially at speeds comparable to the speeds at which they were traveling along the guideway, (iii) subsequently slows each group of vehicles to a predetermined station speed as the group of vehicles are traveling along a respective exit path, and then (iv) directs each vehicle in the group into one of a pair of passenger control stalls, one of which enables passengers to exit the vehicle, and the other of which switches control of the vehicle from exit system control to manual control and enables the vehicle to be manually driven from the station.

Other features of the present invention will become further apparent from the following detailed description and the accompanying drawings.

BRIEF DESCRIPTION OF THE DRAWINGS

FIGS. 4A, 4B and 4C are schematic illustrations of different configurations for a guideway for a system and method according to the principles of the present invention;

FIG. 5 is a schematic illustration of parts of a guideway for a system and method according to the principles of the present invention;

FIG. 12 is a schematic illustration of the manner in which the speed and spacing of vehicles moving along a guideway is controlled, in a system and method according to the principles of the present invention.

DETAILED DESCRIPTION

Figure 1A:
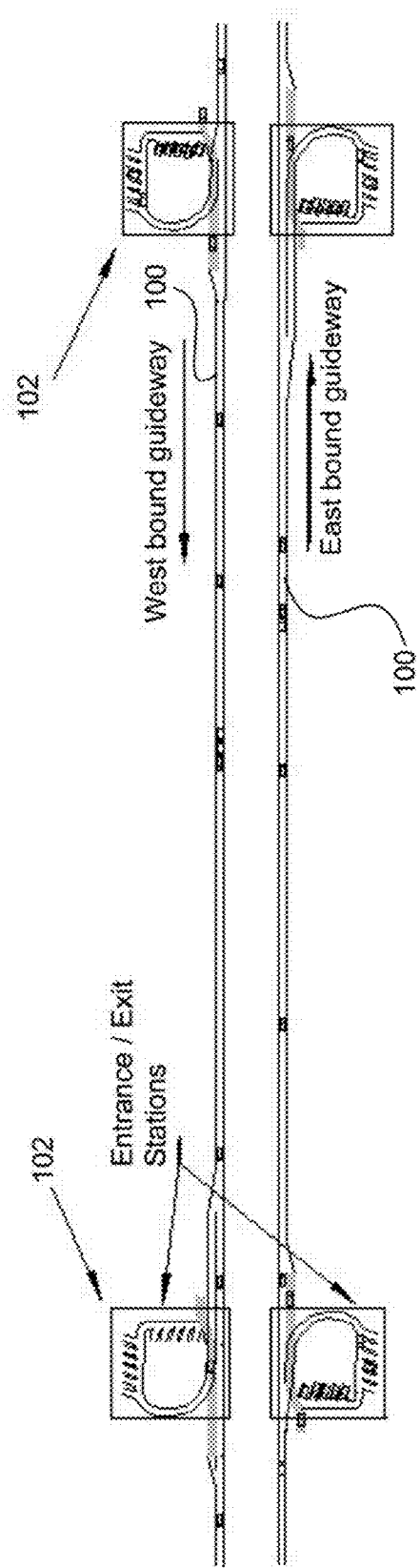
FIG. 1A is a schematic illustration of a system and method according to the principles of the present invention, showing a guideway along which a vehicle can travel from one location to another location, according to the principles of the present invention.

As discussed above, the present invention provides new and useful system, components and methods for a transportation system in which vehicles travel along a guideway between locations (that can be e.g., exit/entrance stations, interchanges where a vehicle changes direction to another guideway, etc.). The principles of the present invention are described below in connection with a transportation system and method for transportation of humans, and from that description, the manner in which the principles of the present invention can also be used with a transportation system and method for freight or other objects will be apparent to those in the art.

Initially, it is believed useful to provide a general summary of the system, components and method of the present invention, and then describe the following features of the present invention: (I) overall system and method principles; (II) structure, features and operation of a guideway for a system and method according to the principles of the present invention; (III) structure, features and operation of a vehicle for a system and method according to the principles of the present invention; (IV) structure, features and operation of an exit/entrance location in a system and method according to the principles of the present invention; (V) overall control strategy for controlling the speed and spacing of vehicles moving along a guideway in a system and method according to the principles of the present invention; and (VI) additional comments and features of a system and method according to the principles of the present invention.

Summary

The present invention provides a transportation system and method in which dual mode vehicles travel along a guideway between the locations (that can be e.g., exit/entrance stations, interchanges where a vehicle changes direction to another guideway, etc.). General objectives of the transportation system and method of the present invention can be used in transportation layouts of the types shown in the map fragments of FIGS. 2A and 2B. Details of the guideway, the vehicles that travel the guideway, the exit/entrance locations, the control strategy for controlling the speed and spacing of the vehicles, and other features and functions of the transportation system and method of the present invention are shown and described in connection with FIGS. 1, 3-12.

In one of its features, the present invention provides a new and useful automated concept for maintaining spacing between vehicles moving along a guideway. The principles underlying that structure and function are illustrated in FIG. 12, and are further described and illustrated throughout this detailed description.

An automated system according to the principles of the present invention comprises a guideway 100 with a plurality of entrance/exit stations 102, each of which has a server that is configured to communicate with one or more of a plurality of other stations and with a plurality of vehicles on the guideway for maintaining speed of and spacing between vehicles moving along the guideway. The guideway 100 has a plurality of guiderails 150 (each of which comprises a ground rail 140 and a power rail 142, described below) configured to carry electrical power. The server at each station 102 is configured to transmit control signals along the guiderail 150 to vehicles on the guideway. Each of the plurality of vehicles comprises an electric vehicle 200 (FIGS. 8, 9A) configured to operate on the guideway 100. Each electric vehicle 200 has (a) a server 202 with a receiver process that decodes a control signal (e.g. a digital control signal that is sensed by a probe 204 that contacts the guiderail 150) into a sync signal component and a spacing signal component, where the difference between the period of the sync and spacing signal components determines the predetermined speed of the vehicles moving along the guideway; and (b) a signal processor that has a virtual scan window, based on the actual speed of the vehicle, that follows the spacing signal component that is used to maintain vehicle spacing in a manner such that the relation of a predetermined point in the virtual scan window to the spacing signal component determines whether the vehicle is maintaining the predetermined speed or whether the speed of the vehicle needs to be adjusted to maintain the predetermined speed and spacing.

Thus, in accordance with the principles of the present invention, a digital signal that decodes into a sync signal component and a spacing signal component is transmitted along the guideway 100 (preferably along guiderail 150), where the difference between the period of the sync and spacing signal components determines the predetermined speed of the vehicles moving along the guideway and by design the spacing of the vehicles. Each vehicle 200 has a server 202 with a signal processor that has a virtual scan window, based on the actual speed of the vehicle, that follows the spacing signal component in a manner such that the relation of a predetermined point in the virtual scan window to the spacing signal component determines whether the vehicle is maintaining the predetermined speed or whether the speed of the vehicle needs to be adjusted to maintain the predetermined speed and spacing. The process is particularly efficient in that as the process adjusts the speed of the vehicle it by default also maintains the spacing between vehicles. Further more as the speed is changed during exit or merge process the relative location of the vehicle to others is by default also maintained.

In a preferred version of this feature, the digital signal is transmitted along the guiderail 150, and is in circuit communication with a server 202 on a vehicle moving along the guideway, via a sensor (e.g. probe 204) that can contact the power rail 142 of the guiderail (via a signal pickup wheel 206 and wiring 208) to provide circuit communication with the guiderail. The server 202 on the vehicle 200 is configured to decode the signal into the sync signal component and the spacing signal component, and to produce the scan window that is configured to follow the spacing signal. The guiderail 150 extends along the side of the guideway and is configured to (i) provide a circuit connection with a source of power for the vehicle, to propel the vehicle along the guideway, and (ii) provide a circuit communication to the digital signal that decodes into the sync signal component and the spacing signal component. The probe 204 on the vehicle can also produce input to the server 202 that can be used in determining whether the vehicle is traveling in a desired orientation along the guideway and producing control signals for reorienting (e.g. steering) the vehicle as the vehicle is moving along the guideway.

In a preferred method, according to the principles of the present invention, the signals that are used to control the speed and spacing of vehicles on the guideway between a pair of stations 102 are transmitted from one of the stations toward which the vehicle is traveling along the guideway. A signal that is transmitted from the one of the stations is electrically isolated from another digital signal that is transmitted from another station that is downstream of the one station, where the said another digital signal can be used to control the speed and spacing of vehicles traveling on the guideway between the one station to the other station. Guidrails are provided on both sides of the vehicle as it exits or enters the guideway at one of the stations, and an exit/enter digital signal is transmitted along one of the guiderails as the vehicle is exiting or entering the guideway at the one of the stations. The vehicle is configured to engage the one of the guiderails to sense the exit/enter digital signal, and the exit/enter digital signal is configured to be decoded into sync and spacing signal components that are used to control the speed and spacing of vehicles exiting or entering the guideway at the station. Preferably, a sensor (e.g. a probe 204) on the opposite side of the vehicle from the sensor that contacts the guiderail while the vehicle is on the guideway engages the guiderail at the exit/entrance location and to sense the exit/enter digital signal.

Figure 8A:
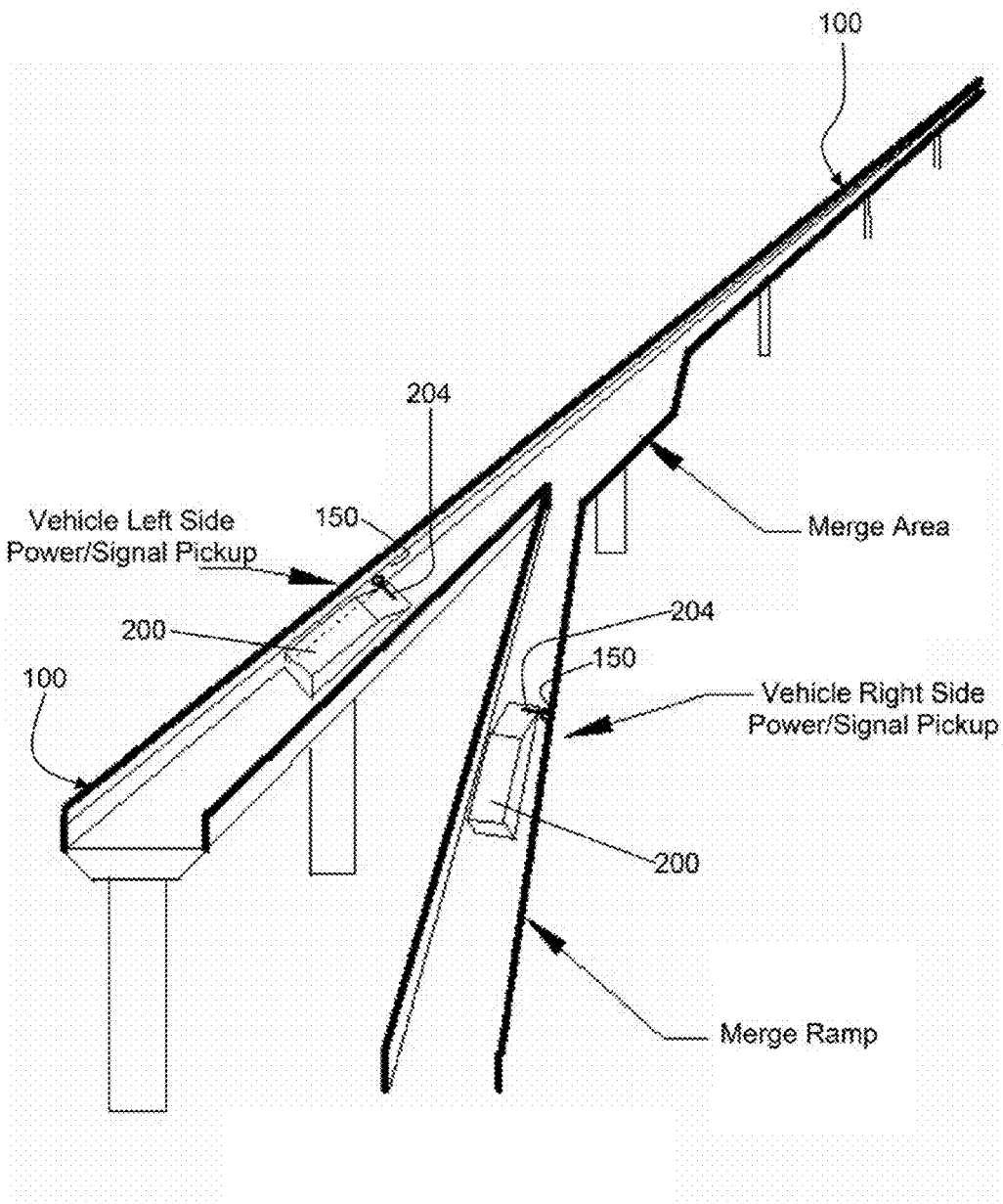
FIG. 8A is a schematic illustration of the manner in which a vehicle can enter a guideway, or change direction to another guideway, in a system and method according to the principles of the present invention.
Figure 8B:
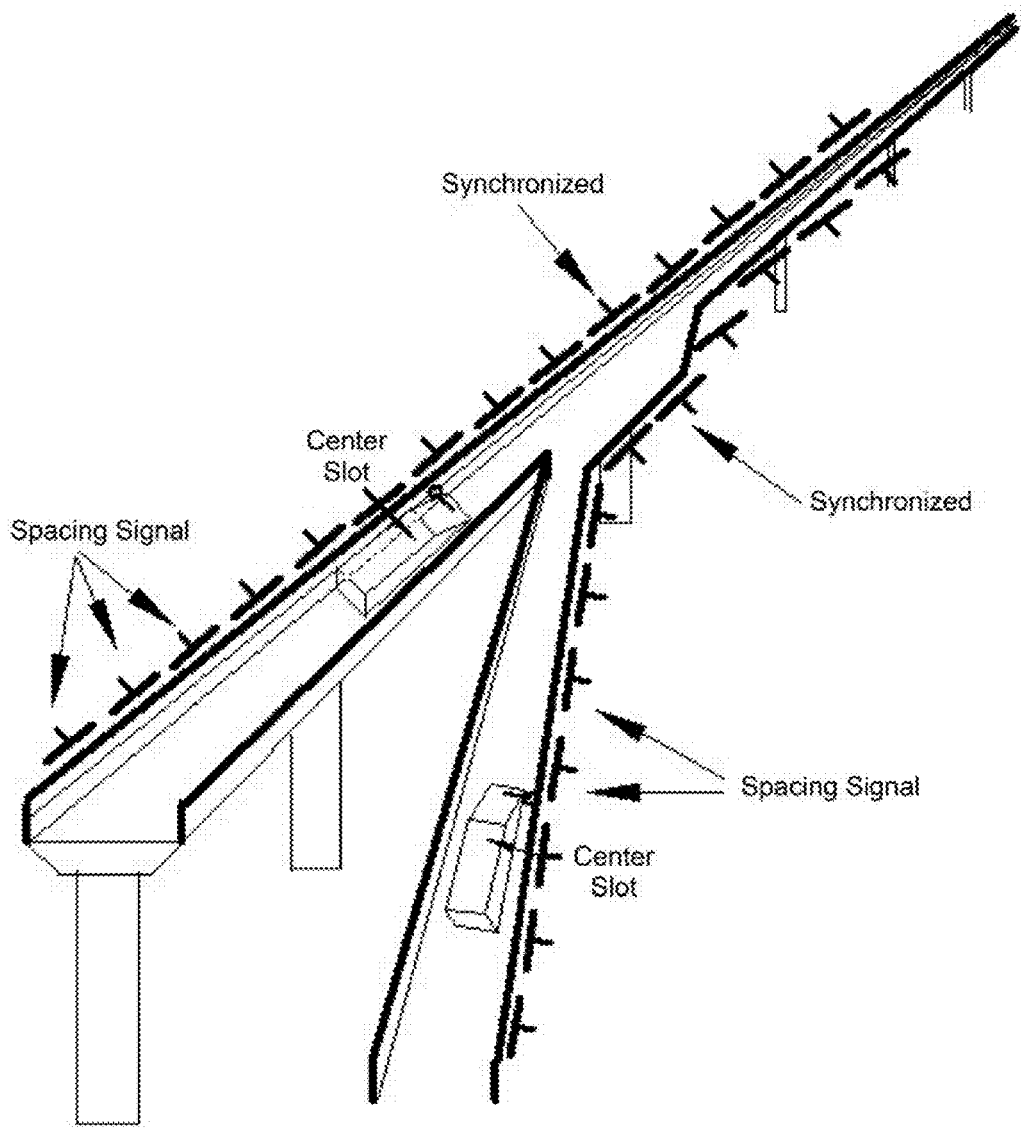
FIG. 8B is a schematic illustration showing a representation of the spacing signals during a merge process, as a vehicle enters a guideway.
Figure 9A:
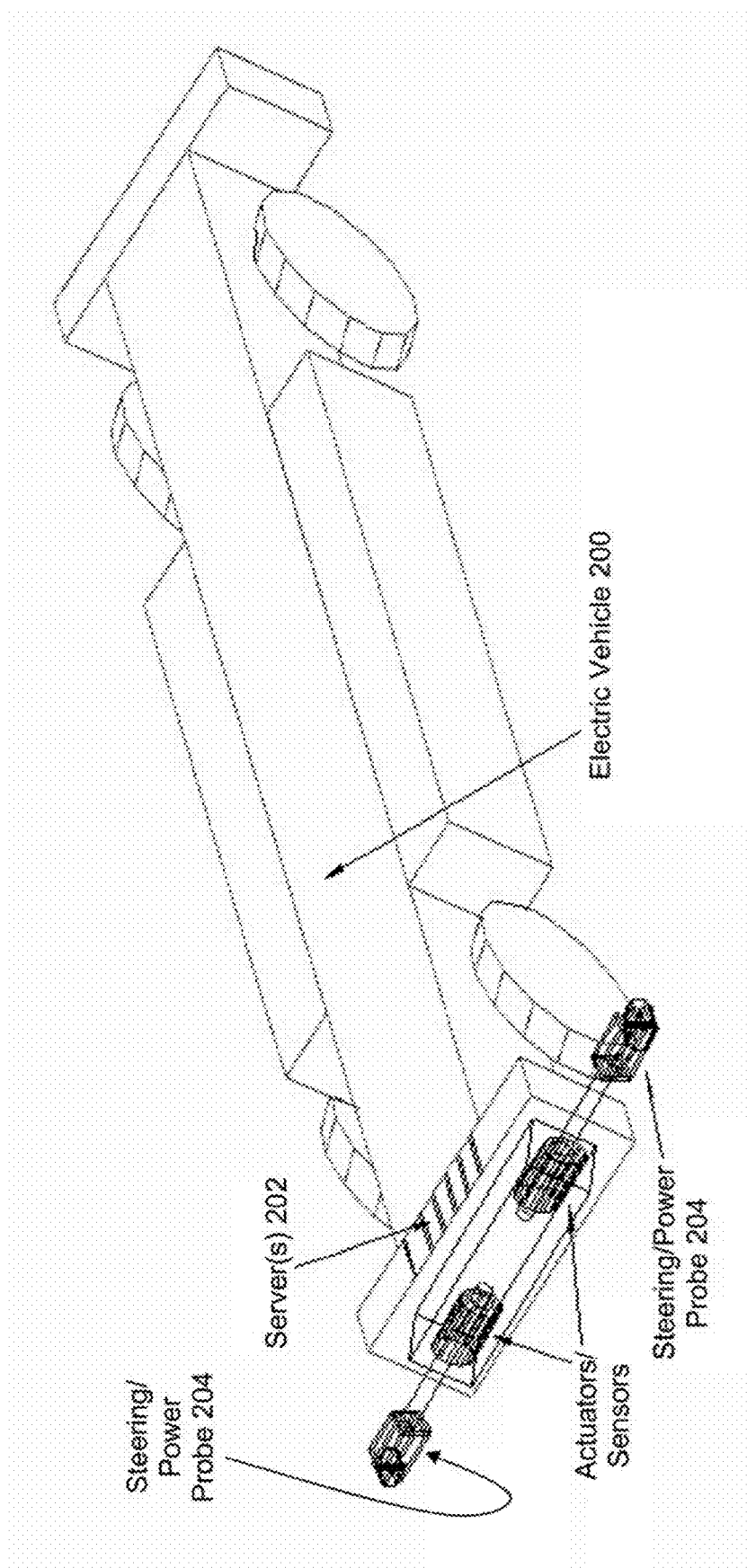
FIGS. 9A and 9B are schematic illustrations of an electric vehicle and some of its components, for a system and method according to the principles of the present invention.
Figure 9B:
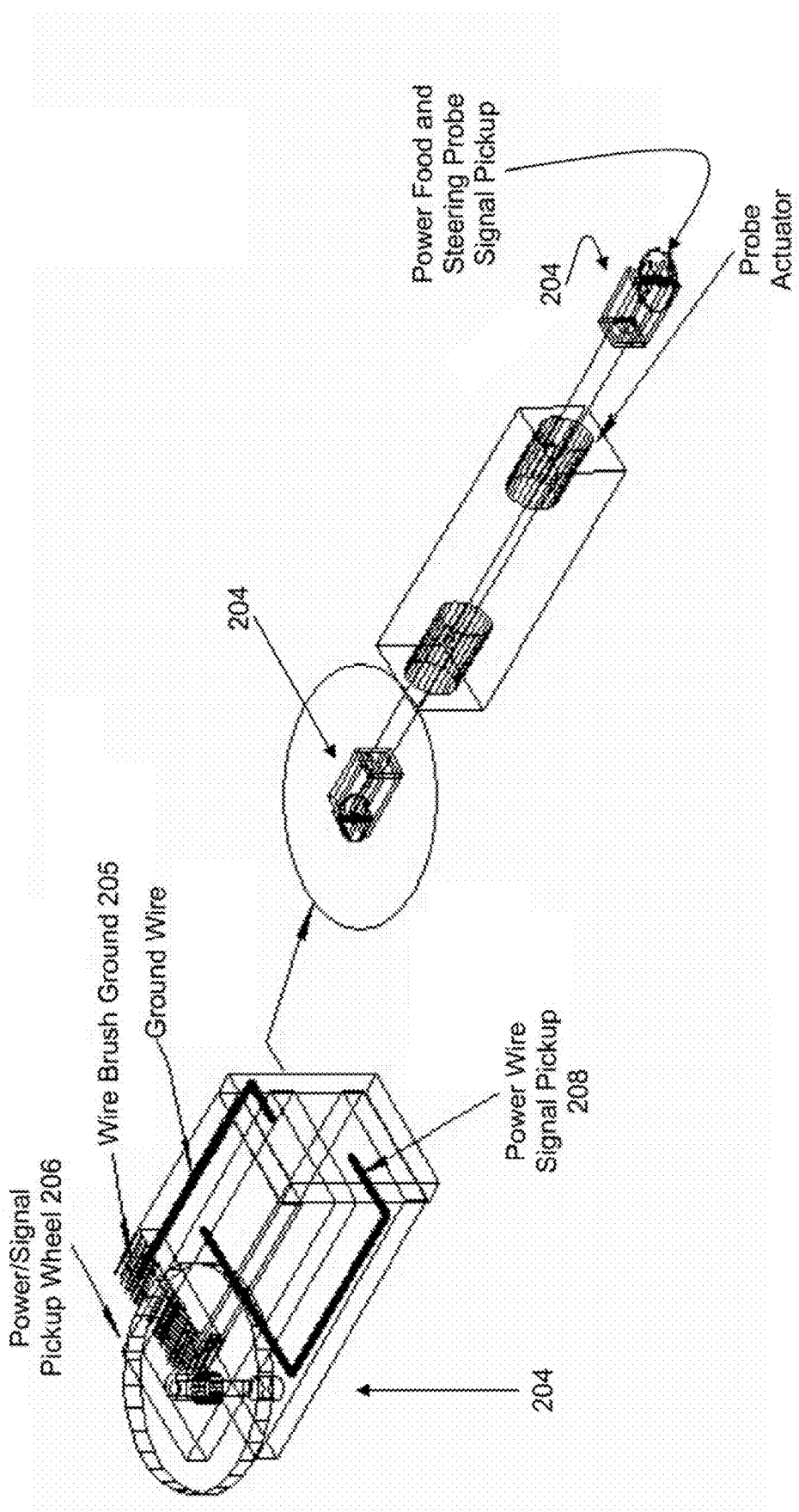

FIG. 8A is a schematic illustration of the manner in which a vehicle can enter a guideway, or change direction to another guideway, in a system and method according to the principles of the present invention. Moreover, FIG. 8B is a schematic illustration showing a representation of the spacing signals during a merge process, as a vehicle enters a guideway. FIG. 8A schematically shows a probe 204 on the right side of a vehicle 200 contacting a guiderail 150 on the right side of the vehicle until the vehicle enters the guideway 100. Then, the probe 204 on the right side of the vehicle is retracted, to disengage from the right side guiderail 150, and the probe 204 on the left side of the vehicle is extended to contact the guiderail 150 on the guiderail 150 that extends along the guideway 100. The principle of extending the left side probe 204 to contact the guiderail 150 on the guideway 100, and extending the right side probe 204 to contact the right side guiderail 150 is also used at exit stations (FIG. 3, 3A-3C) to implement the exit station strategy (described further below), and also at interchanges (FIG. 11), to enable the spacing and speeds of vehicles on the guideway, at exit/entrance stations, and at interchanges to be controlled at all times, according to the techniques and components described herein. Also, as shown by FIG. 8B, the merge (and exit) process is particularly efficient in that as the process adjusts the speed of the vehicle it by default also maintains the spacing between vehicles in a group of one or more vehicles. Further more as the speed is changed during exit or merge process the relative location of the vehicle to others in the group is by default also maintained. The spacing signal has the same frequency and phase throughout the system. Therefore the merge process is made easier. If the spacing signal is synchronized between the guideway and the merge ramp, the vehicle will by default merge into the guideway slot position. When the ramp speed signal component matches the guideway speed signal, the spacing slots will be aligned and the vehicle can slide in between two vehicles with just one vehicle space open.

Still further, in a preferred method, according to the principles of the present invention, digital signals transmitted along any of the rails (e.g. the rails along the guideway and the rails at the exit/entrance locations) can be transmitted on a selected channel at a selected one of a plurality of frequencies. Each transmitted digital signal is configured such it can be decoded into a sync signal component and a spacing signal component, where the difference between the period of the sync and spacing signal components determines the predetermined speed of vehicles moving along the guideway. Each vehicle server has a process that produces a virtual scan window, based on the actual speed of the vehicle, that is configured to follow the spacing signal component in a manner such that the relation of a predetermined point on the scan window to the spacing signal component determines whether the vehicle is maintaining the predetermined speed or whether the speed of the vehicle needs to be adjusted to maintain the predetermined speed and spacing.

Additionally, the probes 204 that are configured to selectively engage guiderails on either side of the guideway also provide data that can be used to produce electrical guidance for use in orienting (i.e. steering) the vehicle as the vehicle is moving along the guideway. Moreover, a master control center is provided for the entire guideway, and produces one or more predetermined master signals that are used by each station along the guideway to synchronize the signals that originate at such station for use by vehicles traveling along the guideway toward such station. The master signals are transmitted by the guiderails 150 and by contact between the guide rails and sensors on the station servers that contact the guiderails and establish circuit communication between the guiderails and the station servers.

I. Overall System/Method Concept

In a system and method according to the present invention, a guideway 100 comprises an elevated roadway that one or more vehicles can enter at exit/entrance stations 102 and travel in selected directions between the stations. At each station 102, a vehicle may continue its travel toward the next station, exit or enter the guideway 100, or may change direction to another guideway. The overall system has stations at each of its ends at which all vehicles either enter the system via the guideway or exit the guideway to exit the system. The overall system allows transportation along the guideways in a high speed aspect between metropolitan areas (e.g. as shown in the map fragment of FIG. 2A), and also allows transportation along lower speed local grid systems within metropolitan areas, as shown in the map fragment of FIG. 2B (In FIG. 2B the guideway 100 has the configuration of a grid, and stations, not shown, would preferably be located at each intersection of the grid). In addition, the same principles described herein for transporting humans on the high speed guideways or the lower speed local grids, can also be used for transporting heavy freight between various locations.

Figure 1B:
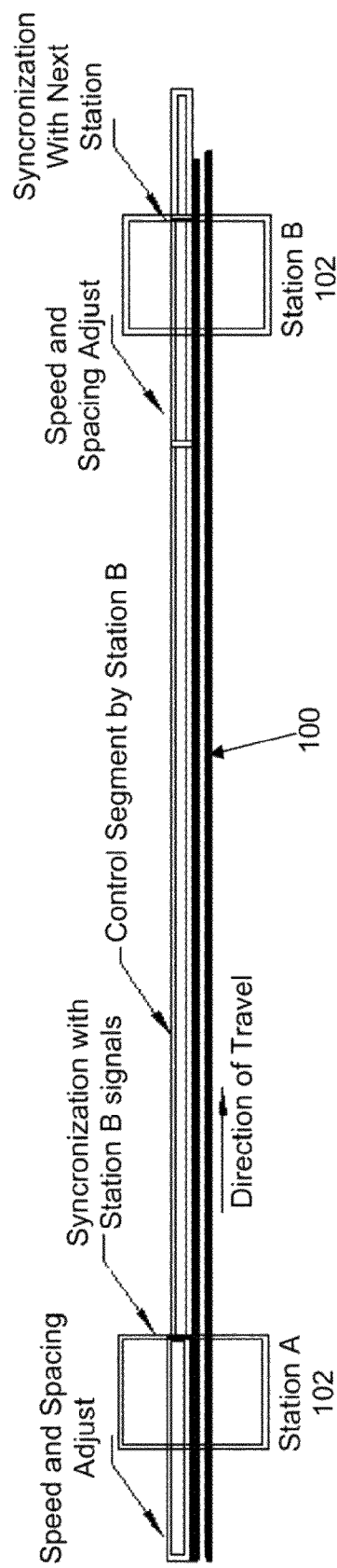
FIG. 1B is a schematic illustration of a system and method according to the principles of the present invention, showing the manner in which signals from exit/entrance stations along the guideway control vehicles traveling between the stations.

FIGS. 1A and 1B schematically illustrate one or more guideways 100 extending between a pair of stations 102. The stations 102 can be exit/entrance stations at which vehicles can exit or enter the guideway 100. Moreover, the principles that enable a vehicle to exit and enter the guideway can also be used to enable the vehicle to change to another guideway going in another direction (i.e. to provide an interchange at the location at which the vehicle can change to another direction), as described further herein. Moreover, those principles can also be used to enable a vehicle that reaches the end of a high speed guideway at one metropolitan area (FIG. 2A) to switch to a guideway that services a local grid at that metropolitan area (FIG. 2B).

As shown in the schematic illustration of FIG. 1B, a vehicle traveling in one direction on the guideway 100 toward a station (e.g. station A or station B in FIG. 1B) is under the control of that station until the vehicle either exits at that station or passes through that station on its way to the next station. The servers at the respective stations are synchronized, as described herein, so that control of the vehicle is turned over to the appropriate station toward which the vehicle is traveling.

II. Guideway

Figure 2A:
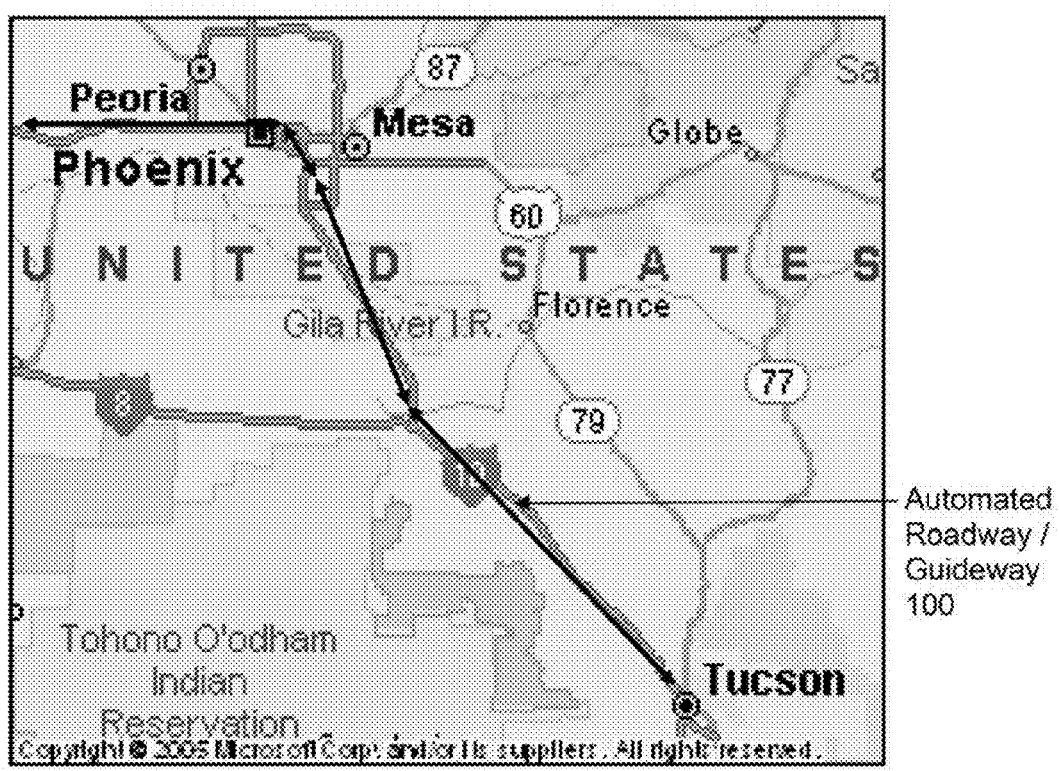
FIG. 2A is a fragment of a map that schematically shows the manner in which the principles of the present invention can be used to provide a high speed link between a pair of major metropolitan areas, according to the principals of the present invention.
Figure 2B:
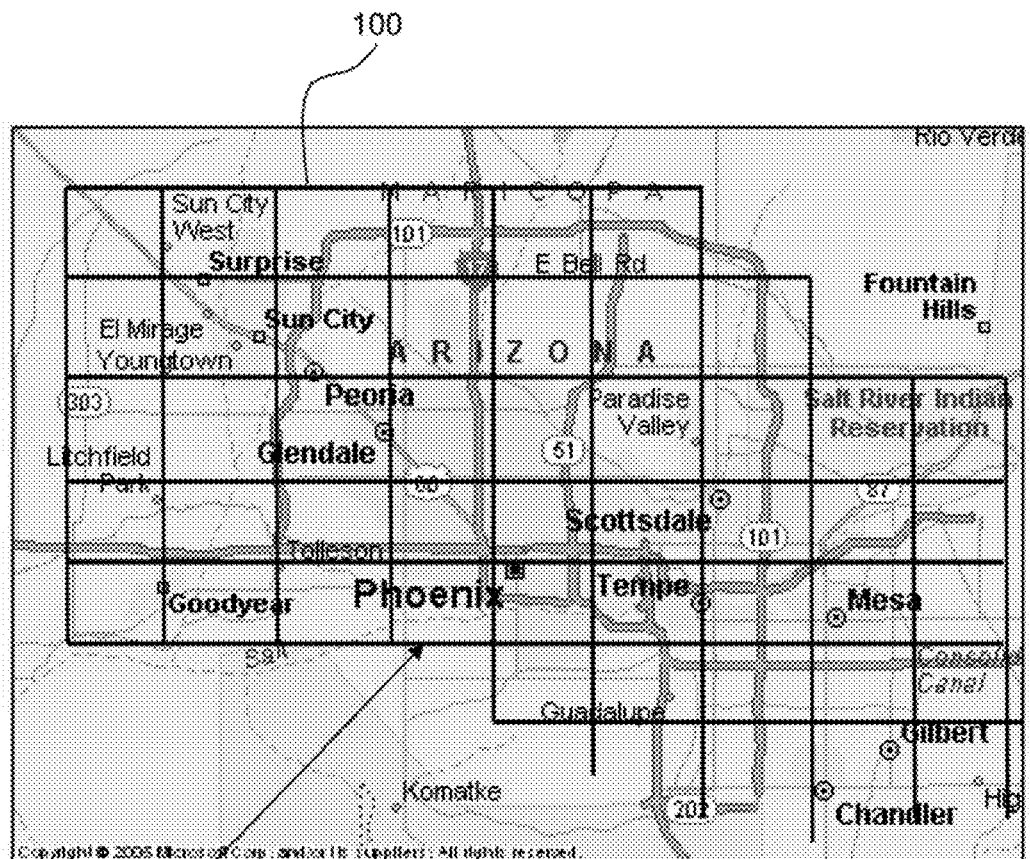
FIG. 2B is a fragment of another map that schematically shows the manner in which the principles of the present invention can be used to provide a link between locations within a metropolitan area, according to the principles of the present invention.

There are three general guideway types: one is a low speed local area grid covering a metropolitan area (FIG. 2B), the second is for a high speed guideway) connecting metropolitan areas (FIG. 2A, and the third is a completely separate heavy haul freight system (not separately shown). In addition, there are three types of stations: entrance/exit, interchange, and connection stations for connecting high speed and local area grids. Entrance/Exit stations 102 (FIGS. 1A, 1B) are strategically placed along the guideway route. The interchange stations (FIG. 11) allow entrance and exit in addition to switching to another guideway 100 going in another direction. The connection stations provide entrance/exit and a connection between the local area grid and the high speed guideway.

Generally, a local area grid (e.g. FIG. 2B) is on a 4 mile layout, but construction would start with the high traffic, high density areas first. The overall objective of the local grid guideways is to locate them beside or down the center of major streets. Interchange stations are designed to be placed at grid intersections and additional entrance/exit stations along the routes at high traffic areas such as office buildings, hospitals, schools, and shopping malls.

The high-speed interconnect shown in FIG. 2A which connects metropolitan areas and the local area guideway has 3 types of stations; a high-speed entrance/exit station, an entrance/exit plus high-speed interchange, and an entrance/exit with local area grid connection.

The heavy freight system will essentially transport freight that would otherwise be transported by railroad or eighteen wheeler heavy trucks. Local delivery from warehouse stations would use conventional truck cabs and drivers. The heavy haul guideway system is completely automated and would do the long distance freight hauling. The heavy haul guideway is built using the same technology as the passenger system. However, it will have a much heavier design to handle large and heavy freight. To maximize energy efficiency, the freight will travel at slower speeds. There will be only one type of entrance/exit station and the interchanges may or may not have entrance/exit stations.

Figure 4C:
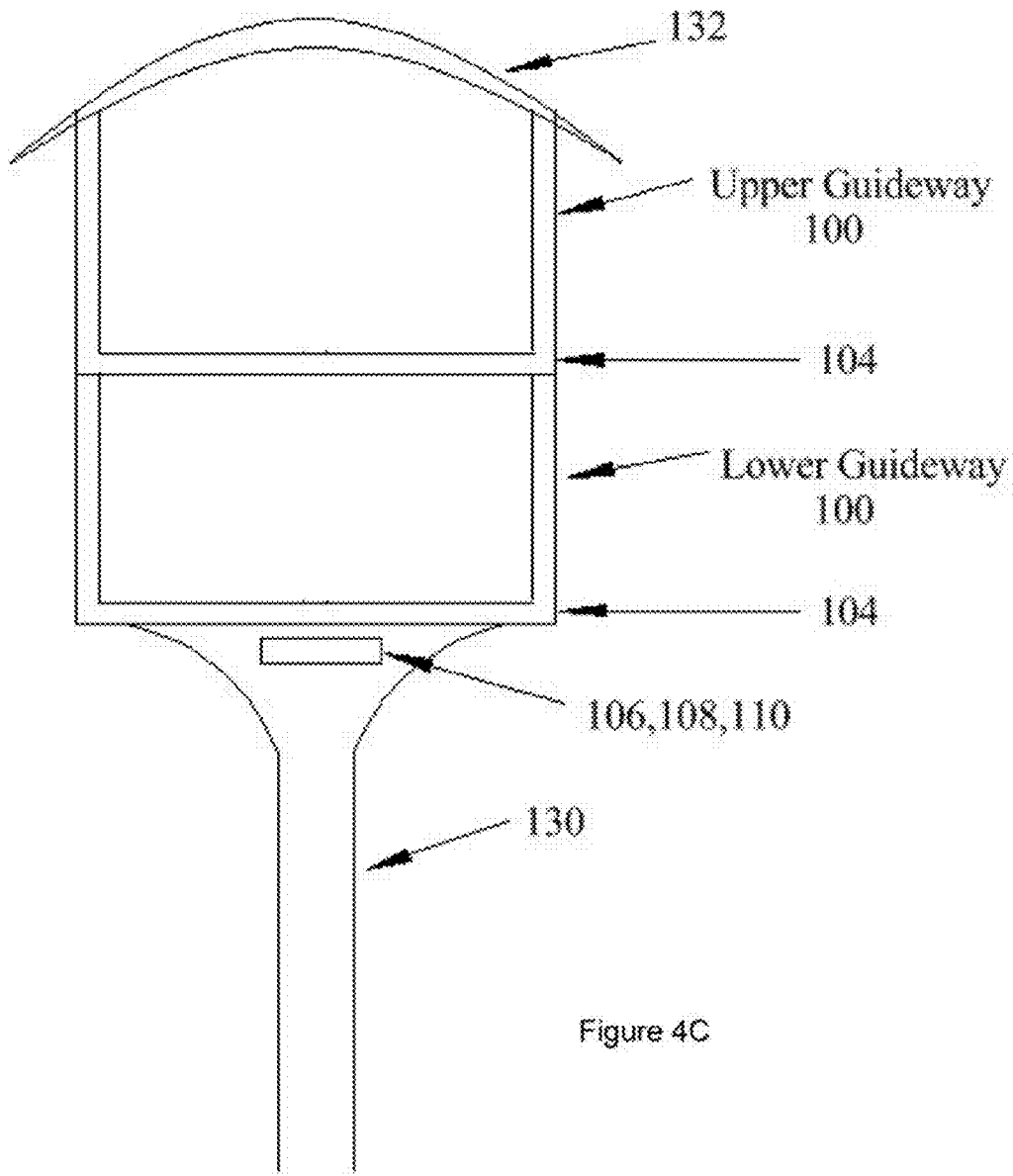

The guideway 100 is basically an elevated roadway that can have several general configurations. (see e.g. FIGS. 4A, 4B and 4C). For example, as shown in FIG. 4A, a guideway 100 can be configured as a single lane for vehicles, so that at least a pair of such guideways would be provided to enable vehicles to travel in two directions between the stations. A guideway can also be configured with a pair of side by side lanes (FIG. 4B), or with stacked upper and lower lanes (FIG. 4C), which would enable vehicles to travel in opposite directions in the same guideway. Further details of a guideway construction are described herein in connection with the single lane guideway of FIG. 4A, and from that description the manner in which the guideway configurations of FIGS. 4B and/or 4C can be constructed will be apparent to those in the art. It should also be noted that in each of the guideway configurations described herein, each lane of the elevated guideway is no more the 10 feet wide with the traffic handling capacity at 140 miles per hour of 7 lanes of interstate highway. Two such lanes (one in each direction) would be equivalent in capacity to a 14 lane interstate highway. Normal land use would continue beneath elevated roadway. The configurations of elevated guideways described herein range from single to double lanes, either stack or side by side.

The guideway 100 of FIG. 4A is built in segments of U shaped channels 104 made of pre-stressed concrete. The base channels 104 will have three large diameter tubes 106 for high voltage power lines, two tubes 108 for communications cables, and two tubes 110 for local power lines. The underside of the base of the guideway segment will have recesses 112 for street lighting and power access boxes. The inside wall of the guideway will have a recess 114 for the power rails on both sides. Water drain channels 116 and drain tubes 118 are built along both sides of the inside of the guideway. Leveling bolts 120 are imbedded into the top side of the base to facilitate connecting a floating roadbed 122.

The roadbed 122 comprises separate slabs (FIG. 7) 122a of high strength concrete with imbedded connection fingers 124 at each end that allow for expansion and contraction. Leveling bolts (FIG. 6) 120 allow for making and adjusting for a perfectly flat roadbed 122. The pre-stressed concrete roadbed slabs (FIG. 7) 122a are manufactured in a factory to be perfectly flat. The roadbed is insulated from the guideway channel FIG. 6) 104 to allow for low cost heating in cold weather. The roadbed slabs 122a have electrical heater wires 126 embedded in the concrete (FIG. 7). The heating elements 126 will ensure the roadbed will not ice up in cold weather.

The guideway concrete channels 104 are placed on top of columns 130 (e.g. about 14 to 16 feet above ground level). The support columns 130 are placed as far apart as is practical to minimize ground level impact and current area usage. The columns 130 and the guideway channels 104 will be built in factories and shipped to the construction site. This will facilitate construction efficiency, standardization, and minimize construction time and costs.

The guideway 100 is covered with a roof 132 to reduce the impact of bad weather and provide a base for solar panels 134. The roof 132 can be supported by for example steel tubes 135 imbedded in the concrete guideway channel. Power tubes (FIG. 6) 136 can also be imbedded in the channel walls periodically to supply power to the rails from the solar panels. The solar panels have tubular rails 138 along the outside edge and one at the peak down the middle. These are used by the solar panel maintenance robot. The robots mission is to clean, test, and replace damaged solar panels.

Figure 10:
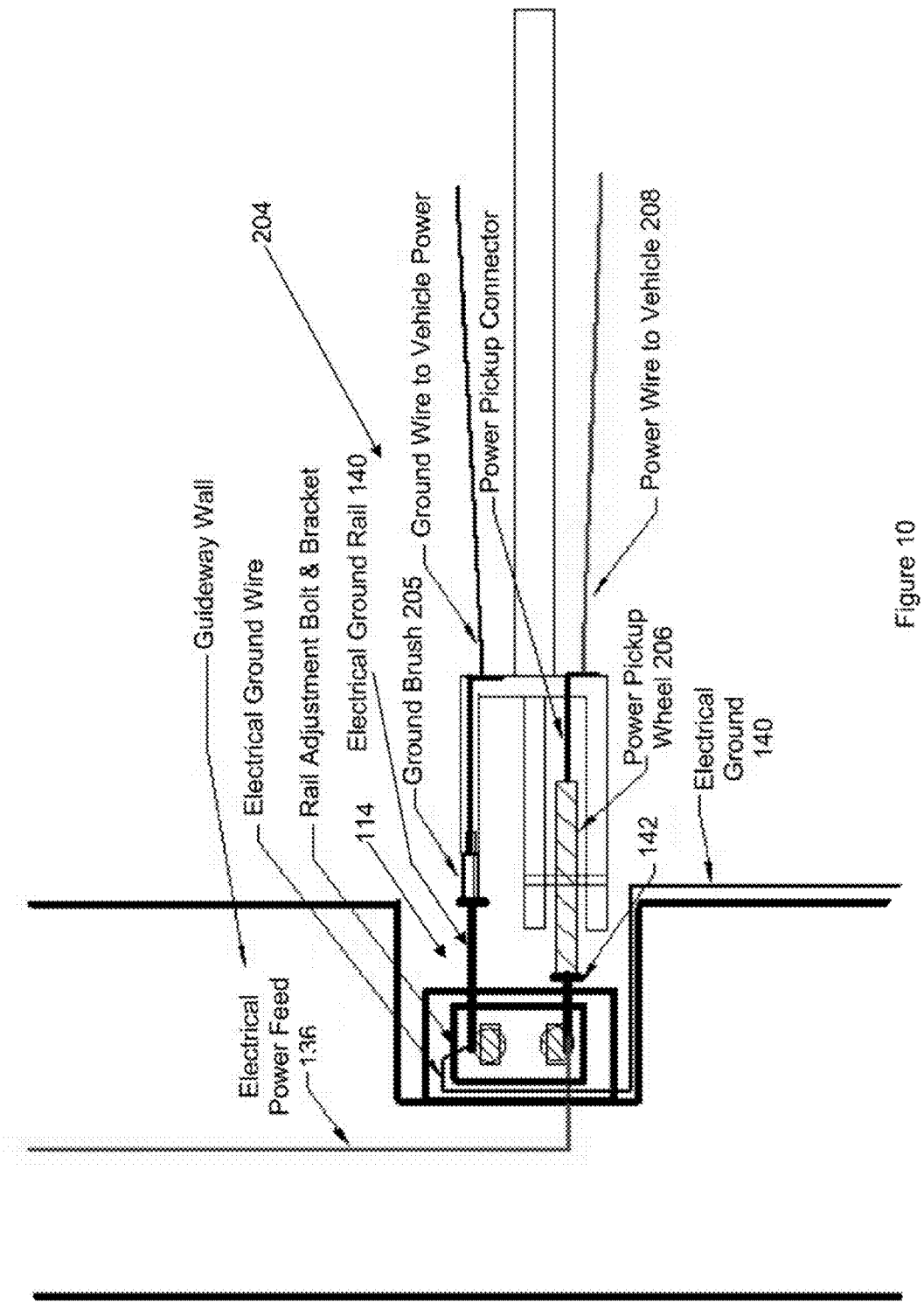
FIG. 10 is a schematic illustration of features of a sensor that extends from a vehicle and contacts a rail of the guideway, in a system and method according to the principles of the present invention.
Figure 11:
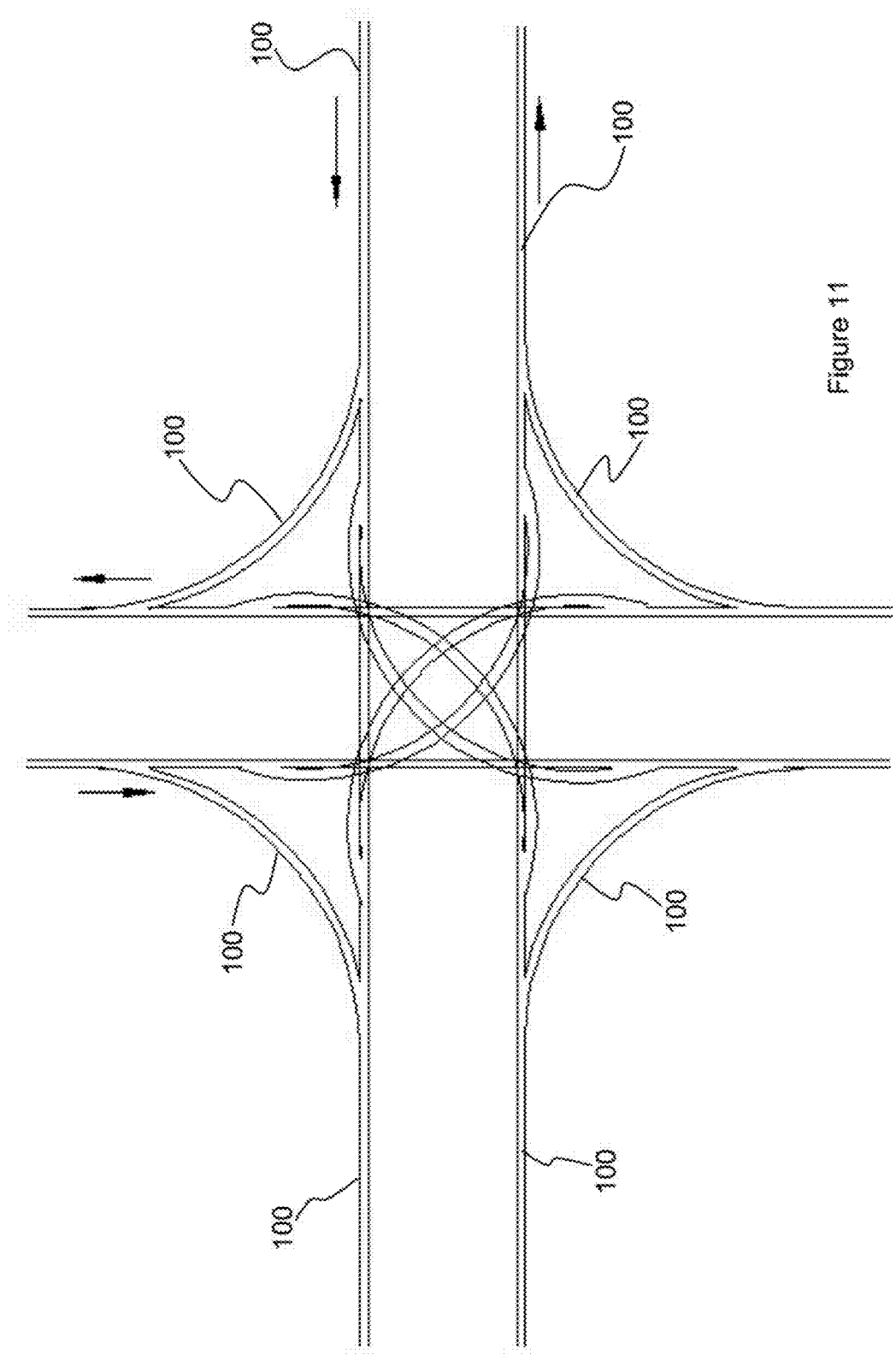
FIG. 11 is a schematic illustration of an interchange configuration for a system and method according to the principles of the present invention.

In the wall of the guideway, e.g. approximately 1½ feet above the roadway surface, is a cavity or recess 114 (FIGS. 6, 10) containing two rails (referred to herein as the guiderails). One rail 140 (FIG. 10) is an electrical ground and is flush with the inside wall of the guideway. The second rail 142 is recessed halfway into the cavity and is in circuit communication with an electrical power feed 136 (FIG. 10). The electrical power feed rail 142 is recessed to shield it from accidental contact by personnel or machinery. The rails have adjustable support braces so as to make the rails absolutely straight and flat. The adjustable bracket allows the walls to be constructed less than perfectly flat and straight.

A robotic machine using laser guidance mechanisms automatically adjusts and tightens both rails to be perfectly straight and aligned with a laser beam. The laser is positioned to cover large distances with overlapping segments. On curves the robotic machine uses the lasers as beginning and ending points of a smooth curve. The robotic machine can be used for the initial construction and for ongoing maintenance. It is essential for a smooth ride that the rails be as straight and flat as possible.

Figure 6:
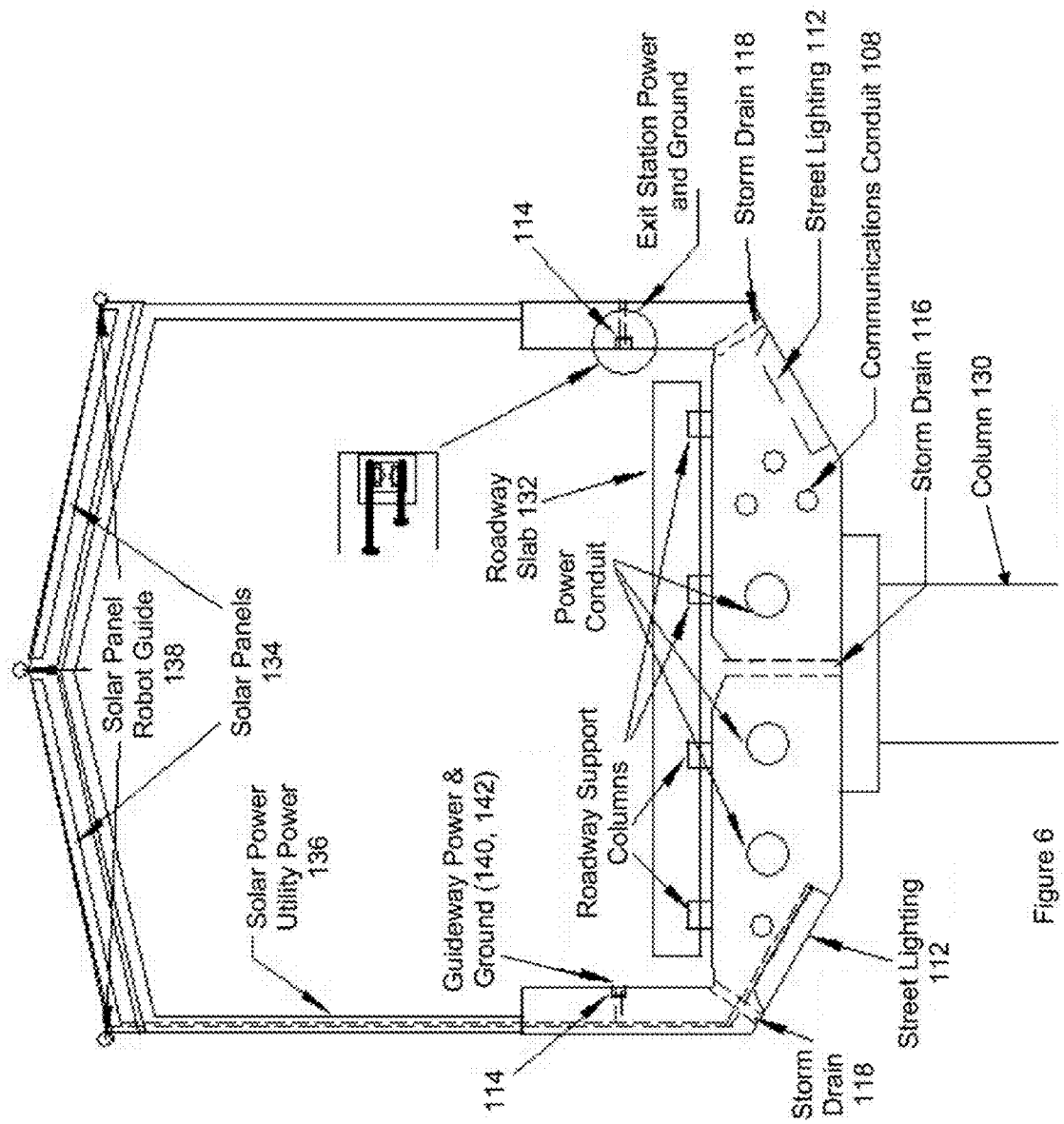
FIG. 6 is a schematic illustration of the interior of a guideway for a system and method according to the principles of the present invention.
Figure 7:
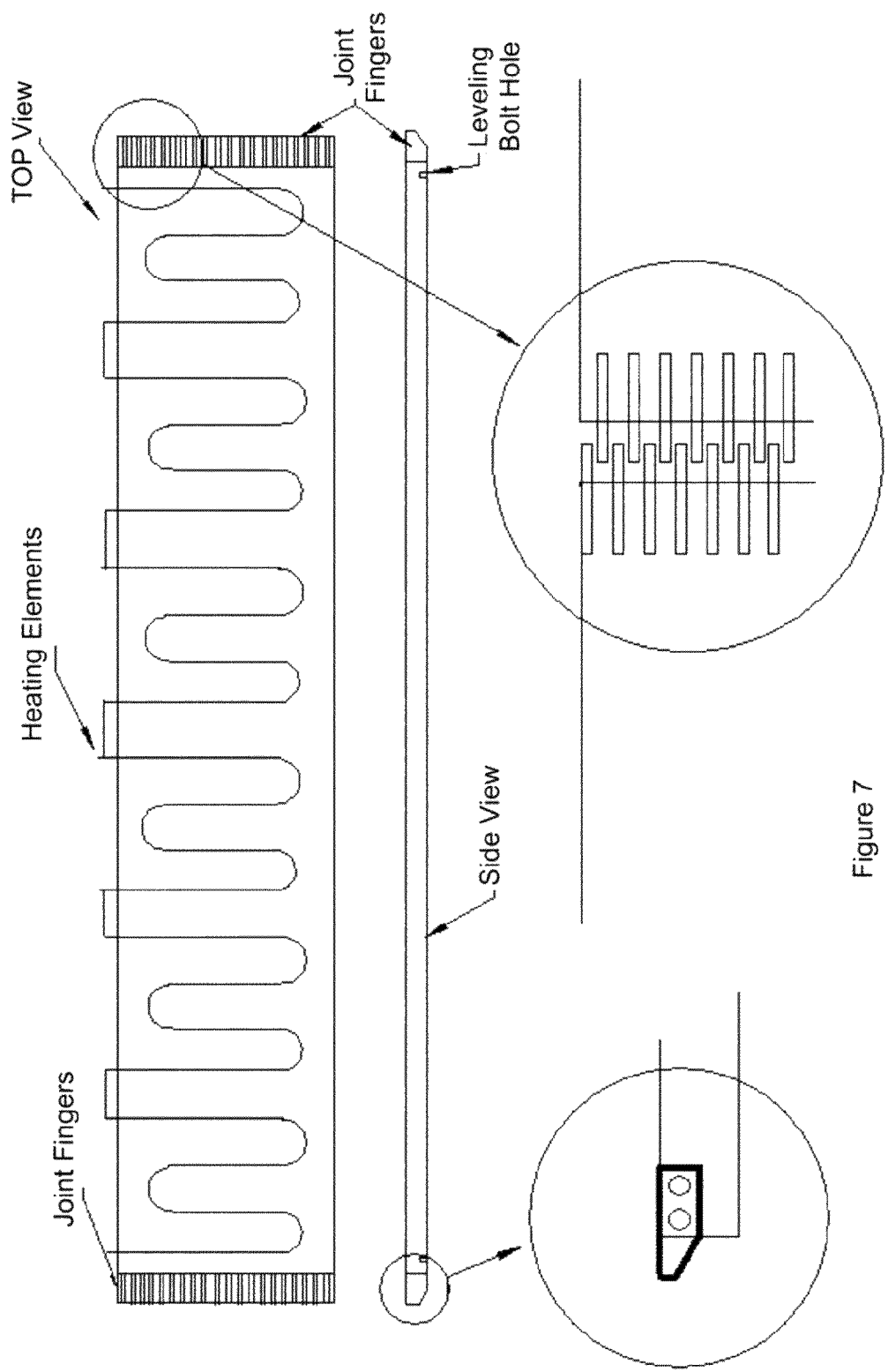
FIG. 7 is a schematic illustration of additional parts of a guideway for a system and method according to the principles of the present invention.

The rails 140, 142, are built into the left side of the inside wall of the guideway (as seen in FIGS. 6 and 10). The left side rails are used for normal running on the guideway. Exit and entrance merge points on the guideway also have right side rails. The right side rails extend along the right side far enough for control to be established on the right side for exit. For the merge process the right side rails extend far enough into the guideway for merging to allow control to be established on the left side. This is expected to be several hundred feet before an exit point and after a merge point. The left side rail can also be continuous between entrance and exit points, thus serving as a backup/failure mode power and control source.

III. Vehicle

The vehicles 200 (see e.g. FIG. 9A) will have steering and power probes 204 on both sides of the front of the vehicle. The normal running of the vehicle on the guideway extends only the left side probe 204 for contact with the rails. The probe mechanism can retract all the way into the body of the vehicle and can extend out, e.g. approximately 2½ ft, to contact and track the rails. The probe 204 has three functions: one to pick up the power for the vehicle, two to steer the vehicle by tracking the rails, three to pick up the control signals (the control signals are described below).

In order to track the rails the probe 204 is solenoid controlled and has a gradient that is sensed by a steering process forming part of the vehicle server 202 which indicates the distance the probe 204 is extended. Because all guideways have the same inside width, the vehicle steering processer can calculate where the center of the guideway is based on how far out the probe 204 is extended. This is calibrated for each vehicle to adjust for each vehicle's width.

The steering process is programmed to keep the probes 204 in contact with the rails at all times and to steer the vehicle to the center of the guideway. This is accomplished with two functions. The first function tracks a pressure sensor in the probe arm and moves the arm in and out to maintain a constant pressure. The amount of pressure is a program variable and can be adjusted by a calibration process. There is also a sensitivity variable which tunes the process. The second steering computer function is to steer the vehicle so that the probe is always at its center point which centers the vehicle in the guideway.

If in order to maintain contact pressure the probe 204 must extend then the vehicle is steered to the left until the center point of the probe is reached. If the probe is retracted to maintain contact pressure then the vehicle is steered to the right until the center point of the probe is reached. Again two program variables control this process one for rate of turning and one for sensitivity to tune the process.

The vehicle 200 (FIG. 9A) is a dual mode transportation vehicle capable of both automated guideway travel and driver controlled street travel. The vehicle 200 is electrically powered with wheel based electrical motors (not shown) in all four wheels. Each wheel assembly also has a steering motor with automatic camber and toe adjustment for computer coordinated turning radius and alignments. Each wheel assembly could also have a magnetic suspension/levitation system for high speed travel. The dual mode vehicle is a "drive-by-wire" design in which a set of computers acting in a fault tolerant mode control the speed, braking, steering, wheel alignments, and suspension systems.

The drive-by-wire function is designed to provide safe normal acceleration and turning capabilities. The vehicle server processor uses acceleration sensors to determine "operating parameters" and compare them against standard normal and emergency parameters so as to keep the vehicle from skidding or sliding out of control. It can detect "road grip" and adjust driving parameters accordingly. Road grip is determined by measuring expected acceleration against measured and the power required to cause wheel slipping. This would allow for safe handling on dry, wet, or icy road surfaces. In an emergency or loss of control the computers would steer in the direction the vehicle was moving in order to regain control. Driver feedback and "normal" vehicle behavior would also be simulated for driver sense of control. This would be accomplished by a feeling of variable resistance in the driver controls. As an example, if the vehicle was starting a turning further turning would be met with resistance appropriate to the tightness of the turn and the speed.

Each vehicle 200 has a power and steering probe 204 on both the left and right side of the vehicle. The probe on the left is used for guideway travel and the probe on the right is used for guideway merge and exit functions. These probes are automated and extend automatically as needed. The right hand probe is retracted while traveling on the guideway. During merges and exits the left hand probe is retracted. Switching between probes is automatic once the entrance or exit process is complete (see discussion above relating to FIG. 8, with respect to how vehicles may enter a guideway). Briefly both probes will be extended, and switching between them only occurs when a good track as been established. The probes are located in the front of the vehicle just behind and above the bumper assembly.

The fault tolerant vehicle server processor manages the dual mode capability by accepting input from two sources. One source is driver control devices with several possible configurations from conventional vehicle control steering wheel and pedals to joy stick control of speed, braking, and steering. Two, in the automated mode the vehicle probes pick up the presence of the guideway and activate a combination power connection and steering probe. Once a power connection is established driver control of the vehicle is suspended. Driver control will be returned when the vehicle is not getting power from the guideway. This would normally occur at the exit point of the guideway or in the guideway if loss of signal and power occurred because of a major guideway failure.

The guiderail 150 comprises the power rail 142 and the ground rail 140. The combination power connector and steering probe 204 is used to track the power rail 142 and the ground rail 140. The ground rail 140 is contacted by a wire brush 205 on the probe which is always in contact with the ground rail when the power roller 205 is in contact with the power rail. For safety reasons the power rail is recessed behind and below the ground rail. A roller power connector 206 is designed to maintain a set distance from the power rail and to track it. Based on the width of each vehicle a predetermined ideal distance factor is calculated to put the center of the vehicle in the center of the guideway. The vehicle server steering processor is then designed to track the power rail and to steer the vehicle to the center of the guideway. Thus, on the guideway, the steering process of the vehicle is automated by tracking either the right or left side power rail. In manual control mode (i.e. off the guideway) both power probes 204 are retracted into the body of the vehicle.

The vehicles also have dual battery systems in a fault tolerant configuration which supply power independently to two sets of wheels. One battery system provides power to the rear wheels, and the second set provides power to the front wheels. In case of system failure, two power bus assemblies can power either set of wheels.

The vehicles also have a safety system that independently watches over the speed and vehicle spacing while traveling on the guideway. If the vehicle does not maintain the assigned speed within tolerances a problem signal is sent to the guideway control and to other vehicles. The safety system would deploy a vehicle-sized air bag in the rear of the vehicle in the event of loss of speed control. Following vehicles would then drop to ¼ speed and push the disabled vehicle to the nearest exit. Once the disabled vehicle is off the main guideway full speed would then be restored. If the guideway has high traffic at the time of the slowdown, some vehicles may have to exit at the station behind the slowdown so that the slowdown does not ripple back past more the a few stations.

The vehicle's passenger compartment and body style can be any design that fits within the published maximum limits for height, length, and width. The vehicles can be configured as passenger cars, sports cars, vans, pickups, SUV's; whatever style is wanted.

IV. Exit/Entrance Station Features

Features of the entrance/exit stations can be appreciated by reference to FIGS. 3, 3A-C and 8. Also, important aspects of those stations (e.g. the merge feature when a vehicle enters the guideway, that is shown and described above in connection with FIG. 8) can also be used when a vehicle is at an interchange where it changes from one guideway to another guideway and merges with vehicles traveling along that other guideway.

Calibrations occur every time the vehicle enters a station from the street as part of the vehicle acceptances inspection. This calibration is performed in the inspection station by a center point laser. The vehicle server steering processor steers the vehicle to the center point laser, senses the center point and extends the probes 204 both left and right to contact the rails and calibrate the center point. Another laser is also used to calibrate the probes to the rail height. The rail assembly has a fine height adjustment to center the probes to run along the center of the rails.

If the vehicle server steering processor fails this process then the vehicle is rejected and must be fixed before it can enter the guideway system. The center point laser shines up from the floor of the inspection station. This laser is shielded from dirt and water. The shield retracts every time the calibration is to be done. The height calibration laser is also shielded and is set in the side of the inspection station.

Normal operation of a vehicle on the guideway 100 then tracks the left side rails. When the vehicle is to exit the guideway, the exit station point is detected and the right side probe 204 extends to track the right side. Once contact has been established the right side probe takes over steering, power, and signal control duties and the left side probe is retracted partway into the body of the vehicle. Once the vehicle has exited the main guideway the left side probe extends again to make contact with the left side rails and the right side probe is retracted partway. Steering control again tracks the left side rails. This is done to allow the exit station to "fan out" the vehicles into multiple parking stations. Every time a fan out exit is chosen by the station computer the vehicle shifts from lefts side to right side tracking and back to left side tracking again. The exit and merge functions are the only time right side tracking is done. As soon as the vehicle has gone though the exit area it switches back to left side tracking.

The merge function (FIG. 8) is started by tracking the right side rails. As the vehicle accelerates up the merge ramp it's speed and position is synchronized with the guideway control signals and it merges into the guideway. The vehicle then switches to left side rail tracking until the desired exit station is reached.

If a change in direction is required at an interchange station (FIG. 11) the exit function is used and the vehicle tracks the right side rail for exit and merges into the change of direction guideway. This process involves a slowing of the vehicle in the interchange and synchronization with the new direction guideway signals. If traffic is very heavy in the new direction exit may be required. If this happens it will be done by the exit station control. The vehicle will then queue up for reentry into the guideway going in the new direction.

Figure 3:
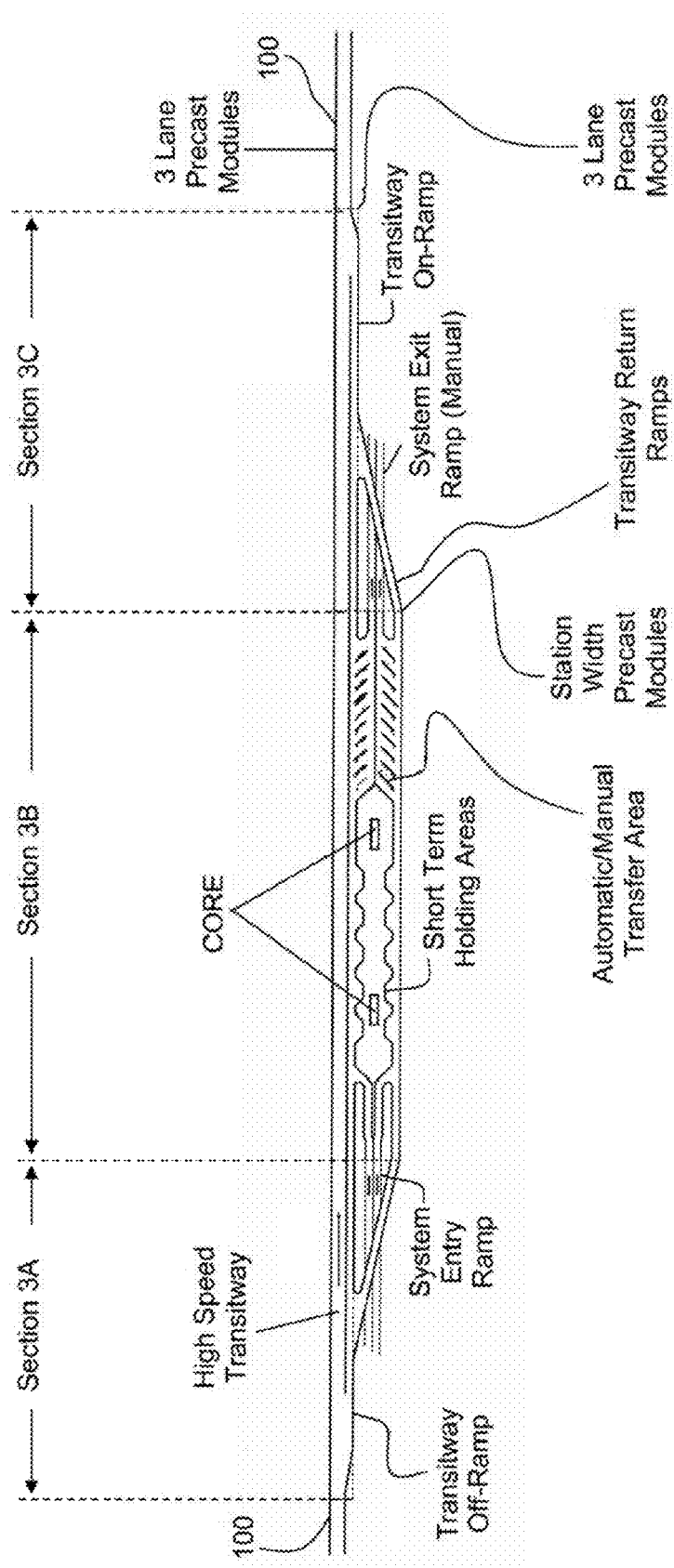
FIG. 3 is a schematic illustration of an exit/entrance station at one of the locations along the guideway.
Figure 3A:
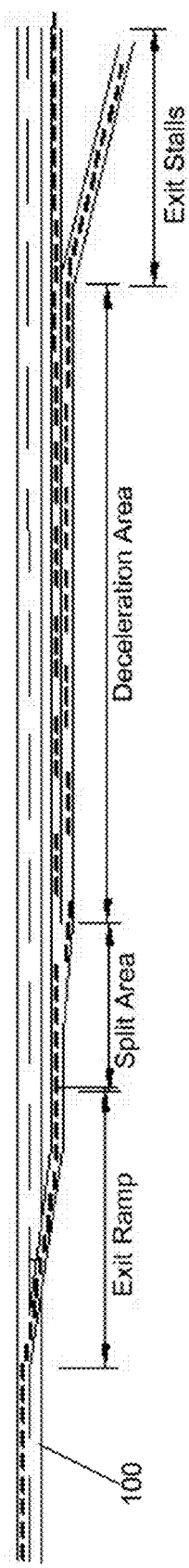
FIGS. 3A, 3B and 3C are schematic illustrations of sections of the exit/entrance station shown in FIG. 3, and schematically illustrating the manner in which vehicles can exit the guideway at a station, according to the principles of the present invention.
Figure 3B:
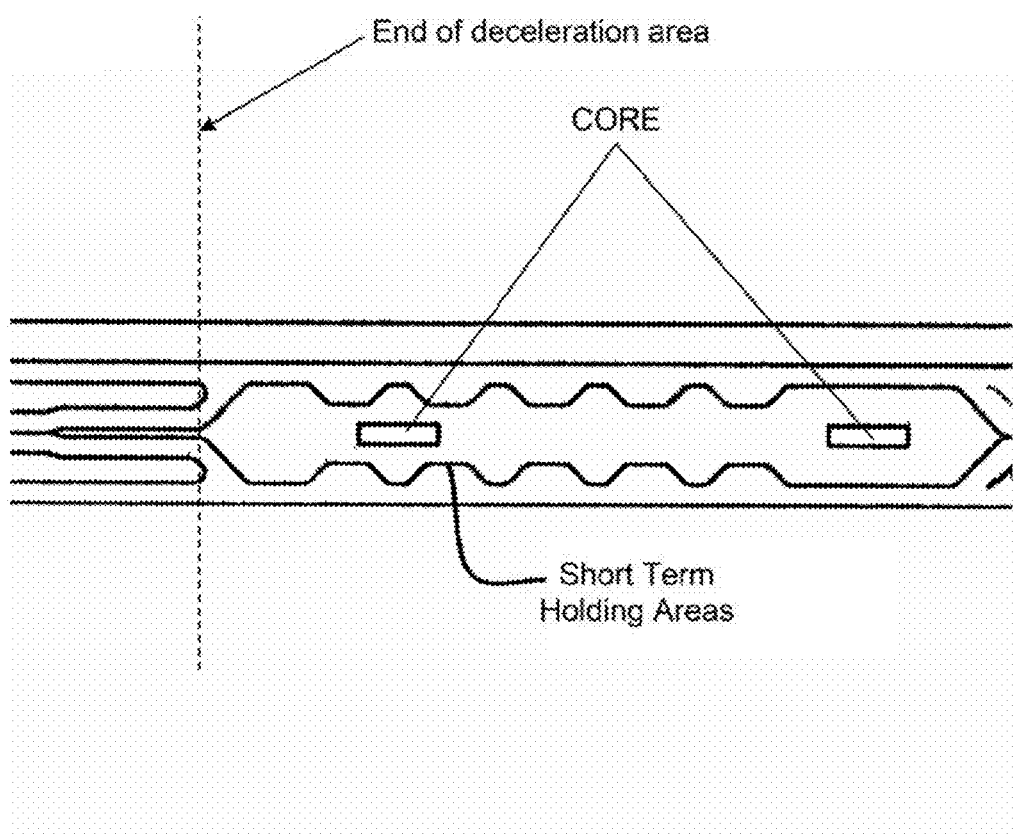
Figure 3C:
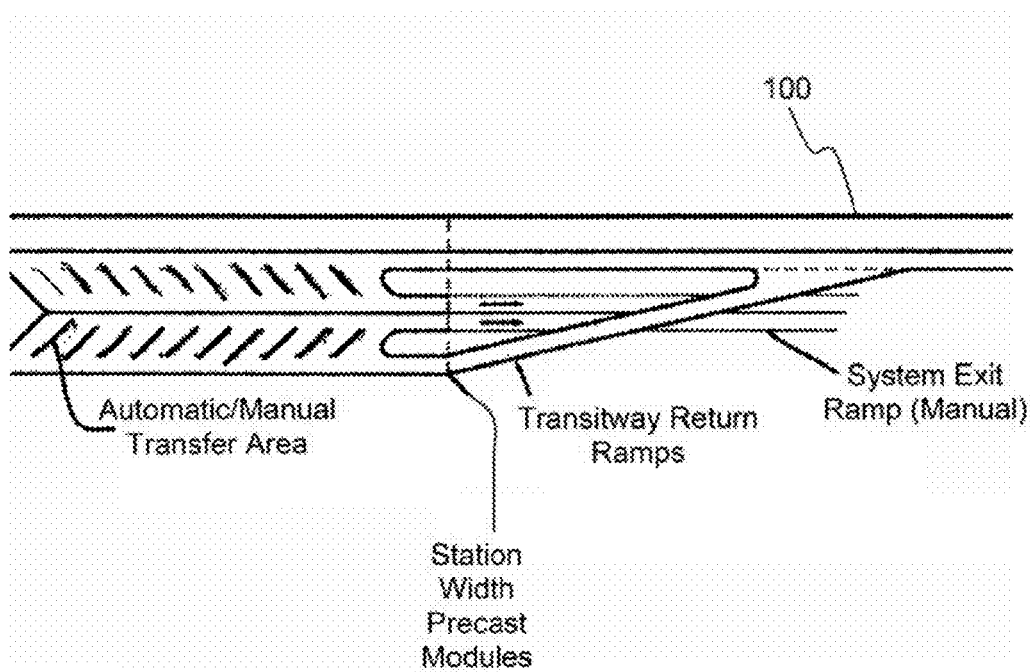

The manner in which vehicles exit the guideway at a station, in accordance with the principles of the present invention, can be appreciated from FIG. 3, 3A-3C. FIG. 3 is an overall schematic of the exit path of vehicles at a station, and FIGS. 3A-3C are schematics of the sections of the exit path of FIG. 3 labeled 3A, 3B, and 3C respectively. Applicant's invention controls exiting of vehicles that are traveling along the guideway 100 under signal control of their speed and spacing to exit the guideway at a station 102. An exit path 300 (FIG. 3A) is provided at the station that enables vehicles to exit the guideway at speeds comparable to the speeds at which they were traveling along the guideway. The control system strategy establishes exit signal control of vehicles entering the exit path at the station (through the station server and connection between the right side vehicle probes and the right side rails) that (i) groups the vehicles exiting the guideway into groups of predetermined numbers of vehicles, (ii) directs groups of vehicles alternatively along one of two exit paths at the station (those paths are shown in FIG. 3A), initially at speeds comparable to the speeds at which they were traveling along the guideway, (iii) subsequently slows each group of vehicles to a predetermined station speed as the group of vehicles are traveling along a respective exit path (see FIG. 3B), and then (iv) directs each vehicle in the group into one of a pair of passenger control stall areas (shown in FIG. 3C), one of which enables passengers to exit the vehicle, and the other of which switches control of the vehicle from exit system control to manual control and enables the vehicle to be manually driven from the station.

Thus, the present invention provides a new and useful way to exit multiple vehicles in a line at a station without causing a slowdown or backup on the guideway. As shown in FIGS. 3, 3A-3C, all vehicles are exiting the guideway. The guideway utilization is at it's maximum with one vehicle right after another. In this extreme case vehicles slowing to a stop in the exit would cause a backup on the guideway causing a slowdown or stopping of vehicles on the guideway. The new and useful guideway exit design of FIGS. 3, 3A-3C creates spaces between vehicles which will enable and be consumed by vehicles slowing to a stop. Multiple vehicles can be managed as one vehicle. As illustrated in FIGS. 3, 3A-3C, three vehicles are grouped and managed as a set and commanded as a set (but the number can be any predetermined number). Space is created between sets of vehicles by alternating sets of vehicles into two exit channels (FIG. 3A). The space thus created between sets will be consumed by the differing speeds of vehicles slowing to station speed (FIG. 3B) where they will eventually be steered into one of two types of passenger control stalls (see FIG. 3C). One type of stall will allow the passengers to exit the vehicle, which is now available to be rented to other passengers. The other type of stall brings the vehicle to a stop, where the passengers do not get out, instead they takeover manual control and drive the vehicle out of the station and onto the street.

Thus, FIGS. 3, 3A-3C show how vehicles enter the exit ramp of the station without slowing down and continue on to the split area still with no slow down. The split area creates space between set of vehicles by shuffling sets of vehicles into one of two deceleration areas. In the deceleration area the sets of vehicles are slowed to station speed and then on to their exit stalls.

V. Control Strategy for Speed and Spacing of Vehicles Along Guideway

The control strategy is based on an electronic process that takes place as a vehicle is traveling along the guideway, and also as the vehicle exits or enters the guideway at an exit/entrance location. The control signals are transmitted along the guiderails and the vehicle establishes circuit communication with a station from which the control signals originate, via the probes 204. The control signals can also be transmitted as broadcast signals, or other forms of signals that can be decoded into the sync and spacing signals in accordance with the principles of this invention.

In a preferred system and method, three control signals are decoded tracked.

a. One signal controls vehicle spacing and is constant within and between control segments.
b. The second signal is a local station communications interface for:
   i. Exit information and requests
   ii. System alerts and control information
   iii. Entrance and exit station speed control and channel selection
c. The third signal codes the speed information and is broadcast on the channel specified by the control channel signal.

Each vehicle server is configured to decode the spacing signal and speed signal. The speed signal can be on one of several channels while the spacing single has but one channel. A separate localized third signal specifies which speed channel to track.

The guideways are divided into control segments spanning many miles. For the high-speed interconnect guideways, the control segment lengths will be determined by exit stations and intersections with other guideways. Most segments would be from 4 to 50 miles in length.

When a vehicle is traveling down the guideway it is tracking the spacing signal and decoding the speed signal on the channel specified. On the guideway between control interfaces all the vehicles are on the same channel. When a vehicle reaches its exit point a new speed control channel will be assigned to that vehicle before it leaves the guideway. Each vehicle exiting has its own speed channel assigned by the exit station control system. One to five vehicles may be controlled together by assigning each to the same channel (only for vehicles following immediately).

Exit stations have varying sizes and capacities for handling traffic. A maximum size exit station could handle the entire output of the guideway and bring every vehicle to a stop. In this case there could be 50-100 vehicles under the control of the exit station at one time. In the extreme case of all vehicles exiting, up to five vehicles at a time will exit together and be controlled together. All five would be assigned the same speed channel.

The exit process comprises the following steps. The process starts at the exit station.

Exit Station Logic Steps a. Check that all exit functions: processors, sensors, and signal generators are functioning correctly
  1. Are open exit stalls available for exit and stops:
    a. Exit to stop and park
    b. Exit to stop and use manual control to exit the station to the street
  2. Broadcast the availability of each type of exit (park or exit to street)
  3. Attend to vehicles wishing to exit
    a. assign a speed channel to the vehicle
    b. synchronize the spacing signal with the guideway spacing signal
    c. synchronize the speed signal with the guideway speed signal
    d. signal the vehicle to switch to the exit station channel
    e. set the exit path signals to the exit stop point f. check for vehicle in exit guidepath
g. plot each vehicles speed and location
h. adjust each vehicle speed to maintain minimum spacing and slow to station speed.
i. at station speed revert to standard spacing signals by synchronizing with standard spacing signal.
j. change the speed signal to slow the vehicle to a stop at exit point.

Vehicles must watch for signpost. Prier to each exit or interchange station, the distance from the station depends on the normal speed of the guideway, an electronic sign conveys the address of the station, the status of the station, and failure control information. The failure information can cause the vehicle to exit which means the vehicle will start tracking the right side. The nature of the sign may be RFID, or inferred, or magnetic or some other electronic means.

The entrance process is controlled basically the same way the exit process is controlled. The entrance process is where the fault tolerant features are most important. As an analogy, every time a passenger jet takes off at some point down the runway that plane must take off—no matter what happens. This is a fail safe point after which if an engine fails the plane must still take off. Passenger jets have double the power required to ensure the take off can occur even if power is lost in one engine.

Merging the guideway vehicles at high speed requires the same kind of over-engineering. As a vehicle accelerates to merge with traffic the fail safe point is passed and the vehicle must merge at the guideway speed. The vehicles must then have multiple engines and enough reserve power to complete the process.

The vehicle power system design provides more than enough power to complete the merge process. The electrical power will come from the guideway but, should power fail, the vehicle's batteries would have enough power to more than complete the process. Each vehicle will have four electric motors one in each wheel. These are especially designed for this purpose and are high torque multi-poll permanent-magnet DC motors. The DC design is to simplify power management and enable solar cell power without the losses inherent in converting DC to AC.

The entrance merge process is controlled by the station. All vehicles must pass electrical, control, visual inspections, calibration, and power tests before proceeding to the entrance ramp. An in-station vehicle control system handles movement of the vehicles in the station. Each vehicle in the station has its own control channel.

The entrance process starts when the vehicle enters the launch point at the base of the entrance ramp and stops. Then the merge process takes over.

Merge Process Steps:
1. Check for open space on guideway.
2. Notify passenger(s) of merge process start
3. Synchronize merge spacing signal with guideway spacing signal
4. Set start time for merge process
5. Start merge by accelerating vehicle up the ramp
6. Synchronize the merge speed signal with the guideway speed signal
7. Merge vehicle and change from in-station to guideway left side control
8. Vehicle now tracks left side guideway signals.

All vehicle control processes are done the same way. The vehicle systems just track the signals; the only variable is the speed control channel. The same process is used for the local loop guideways, the high speed interconnect guideways, the exit process, the in-station control, and the merge process.

One other type of merge process is the handoff from local loop to local loop and from local loop to high speed interconnect. These also use the same General process. The direction change ramp must synchronize with the guideway signal, slow the vehicle, then synchronize with the interchange holding signals, and then when an open space is available accelerate the vehicle and synchronize it with the new direction guideway signal. The new direction guideway may be running at a higher or lower speed than the previous guideway. This function requires the computer to create a virtual view of multiple vehicles and maintain a minimum separation between vehicles. This requires plotting and projecting the position and speed of each vehicle on the ramp. Note also, up to five vehicles may be assigned the same channel and act as a group. This is used only when vehicles directly follow each other with no vehicle spaces between them. This has physical design consequences. Each merge point must be large enough to handle the length of five vehicles at one time.

This process is very simple in that all that is required is for the two sync signals to match frequencies for the vehicle to merge successfully.

The vehicle receives two signals from the guideway, a sync-signal and a spacing-signal. As seen from FIG. 12, these two signals are used by the vehicles control computer to locate and synchronize the vehicle on the guideway. The sync-signal and the spacing-signal are a transmitted digital signal that is transmitted along the guideway and decoded by the vehicle servers. The signals are synchronized in both frequency and phase. The frequency of the sync-signal can be changed to control speed, but the phase of the signals must remain synced. Standard radio frequency formulas provide physical dimensions of electromagnetic waves. For example, a signal of 21 Mhz will provide a peak to peak physical spacing of 22 ft, by the formula: FreqMhz=462/length in feet.

The virtual scan window, based on the actual speed of the vehicle, provided by the vehicle server, is a location sensor started and synchronized by the sync-signal. The virtual scan window is a time based value sensor. There is a center point in the middle of the virtual scan window which is used to indicate the virtual center of the vehicle. The center point is a variable sized point measuring for example from 1 to 100 scan points.

If the peak of the spacing signal falls anywhere within the center point, the vehicle server processor considers the vehicle centered. The scan Window is a variable sized window, varying for example from 1,000 to 100,000 scan points. The center point and the scan window variables are set by an external program and are used to tune the process. The scan window's view of the spacing signal is controlled and synchronized by the sync-signal. The spacing signal's frequency is set by an external program variable, which determines the spacing between vehicles. The sync-signal and the Spacing signal are digitally generated and transmitted as a signal. The spacing signal is designed to have a long slope on both sides of the peak. This is to allow a graduated adjustment of speed. The lower the signal level from the peak, the larger the magnitude of the speed adjustment.

The control process strives to keep the center point at the peak of the spacing signal. If, as the diagram indicates, (FIG. 12) the center point is ahead of the peak of the spacing signal, then the vehicle is going too fast and needs to slow down. The computer reduces the speed of the motors. If the center point is on the peak of the spacing signal, no change in speed is made. If the center point is to the left of the peak, the speed is too slow, so the speed of the motors are increased. The magnitude of the speed change is set relative to how far the center point is from the peak. The farther from the peak the center point is, the greater the magnitude of the change. The magnitude value is set in an externally set table. This table is also used as a speed control process tuning table.

The actual physical speed of the vehicle is determined by the difference in frequency between the sync-signal and the spacing signal. If both are at the same frequency the vehicle is stopped. If the sync-signal has a higher frequency then the spacing signal the vehicle will move backwards. If the sync-signal has a lower frequency then the spacing signal the vehicle will move forwards. The greater the difference in frequency, the faster the vehicle will go. The sync-signal frequency is set by an external program variable used to manage vehicle speed.

The vehicle control system can be further understood from the following example (Reference FIG. 12 for this discussion):

In case 1, speed is set to zero and the sync signal and the spacing signal are at the same frequency or period. The virtual scan center point is in the center of the spacing signal so no change in speed is required.

In case 2, the required speed is set to 140 mph by the station to which the vehicle is traveling and the sync signal has a higher frequency or period than the spacing signal. The virtual scan window Vsw1 in FIG. 12 is synchronized to and started by the sync signal and is offset by an amount equal to 140 Mph from the center of the spacing signal. This would cause the Vsw1 center point to be behind or to the left of the spacing signal which would be interpreted by the speed and spacing process to mean the vehicle must go faster. As the vehicle gains speed it's speed is measured by an external sensor and a speed offset value is calculated for what ever speed the vehicle is going. At Vsw2, the offset actual speed value is added to the start of the virtual scan window. If the center of the scan window is still to the left of the spacing signal center point the vehicle will be instructed to continue accelerating. Once the speed of the vehicle is equal to the offset required to match the required speed, the scan window will be centered on the spacing signal and the vehicle speed control process will stop accelerating the vehicle and it will stay at that speed.

The speed and spacing control process is synchronized for all vehicles by the spacing signal. Synchronizing all vehicles is important to the process which will then automatically maintain vehicle spacing as a by product of the speed control process. This very efficient process is used in the second level electronic layer of the vehicle control process.

VI. Additional Comments and Features of a System and Method According to the Present Invention.

a. The speed and spacing signals work together to do two things simultaneously. The process of centering the vehicle on the spacing signal by slowing down if ahead of the peak of the spacing signal or speeding up if behind the peak gets both speed and spacing control from one process.

b. The guideway control segment is controlled by the station the vehicles are heading to. The station must synchronize it's signals with the next station down the line. That means the system provides an auto failure function, because if the station stops receiving the signal from the downstream station then there has been a major system failure and it must now exit all vehicles. It is not possible for the vehicles to continue past the station as there are no signals to follow.

c. The system provides a fail safe function, because if vehicles stop receiving the transmitted signals they auto slow at the same rate to an emergency stop. If the break in the signal is caused by and earthquake breaking a section of guideway those beyond the break continue on, those before the break auto stop.

d. Also in connection with a vehicle changing direction or merging to a different speed, the interchanges all have exit and entrance stations. If the direction change guideway is full then vehicles must exit or continue on the direction they were going and perhaps reroute. This condition can be predicted ahead of time because every vehicle entering the system declares it's intended exit and a default route. So a grid communications network sending messages over the internet which the vehicles and the stations will be connected to will allow every station to calculate its load and the guideway load over time.

e. Vehicle to adjacent Vehicle communications is preferably provided to share energy cost when in a train of vehicles. Blue tooth technology is one way of accomplishing this objective.

f. A station control function is to create a continuously updated map of vehicles in its control segment and to communicate that to the vehicles so that the vehicles can make intelligent decisions on linking up to save energy.

g. Station electronic sign posts are also required to tell a vehicle exit station is near and to deploy the left side power and signal probe.

h. Stations must also have a vehicle sensor upstream of the station to detect open slots and used slots. If the slot is used what is the vehicle id so we know if that vehicle is going to exit.

i. Those in the art will also recognize that the present invention has several safety features. For example, vehicles have a single channel to travel in with no possibility of a head on collision. Side collisions are also improbable as vehicles follow each other single file. Sudden human driver impairment or loss of control is eliminated while the vehicles are traveling on the guideway as a human driver is not used. The high capacity of the system should all but eliminate street level traffic congestion which also helps to reduce traffic accidents.

As will be apparent from the foregoing description, the control strategy is the heart of the apparatus, system and method of the present invention. The control strategy of the present invention avoids the instability problem by having each vehicle track a control signal. The relative speed and distances of other vehicles is not part of the control strategy except for an oversight safety function in case of malfunctions. The control strategy is implemented through a multi level functional hierarch. The first level is the hardware layer that comprises the mechanical connection and tracking of a power and vehicle steering guide rail. The second layer is the electronic communications and basic control function. The third layer is the logical layer, which through programming logic, controls vehicle movement between second level vehicle control virtual slots.

Level 1 Physical Control:

Prior designs for steering automated vehicles all uses rail(s) which mechanically locks the vehicle steering mechanism to the rail. Therefore, the vehicle must follow the rail. The problem with this design is the vehicle is locked to the rail and an external rail switch must be switched for the vehicle to take another path. External mechanical switches cannot respond fast enough for vehicles following close together at high speed to select one out of a group of vehicles. There is also the problem of communicating which vehicles are going to be switched and which are not. The external system would have to know which vehicle is which and which ones are to switch and which are not.

With the present invention, the vehicles will have a steering and power probe on both sides of the front of the vehicle. The normal running of the vehicle on the guideway extends only the left side probe for contact with the guiderail. The probe mechanism can retract all the way into the body of the vehicle and can extend out approximately 2½ ft to contact and track the guiderail. The probe has three functions: one to pick up the power for the vehicle, two to steer the vehicle by tracking the guiderail, and three to pick up the control signals. In order to track the guiderail the probe has a gradient that is sensed by the vehicle server which indicates the distance the probe is extended. Because all guideways have the same inside width, the vehicle server process can calculate where the center of the guideway is based on how far out the probe is extended. This is calibrated for each vehicle to adjust for each vehicle's width. The vehicle server steering process is programmed to keep the probe in contact with the guiderail at all times and to steer the vehicle to the center of the guideway. This is accomplished with two functions. The first function tracks a pressure sensor in the probe arm and moves the arm in and out to maintain a constant pressure against the rail. This function works at a high sample rate and very quickly adjusts the pressure. The amount of pressures is a program variable and can be adjusted by a calibration process. There is also a sensitivity variable which tunes the process. This probe-pressure function is separated and functions independently of the vehicle steering function. The second vehicle server steering process function is to steer the vehicle so that the probe is always at it's center point which centers the vehicle in the guideway. This function works at a much slower sample rate and has program variables to adjust the number of samples taken before commands are issued to change the steering. Program variables also adjust the amount of steering change. These variables allow the steering process to be tuned.

Level 2 Electronic Control:

The vehicle control process is relatively simple. Three control signals are decoded.

One signal controls vehicle spacing and is constant within and between control segments.

The second signal is a local station communications interface for:
 Exit information and requests
 System alerts and control information
 Channel selection for entrance, exit, and interchange station speed control (Note: a secure wireless interne connection to the stations could provide this function).

The third signal codes the speed information and is broadcast on the channel specified by the control channel signal.

Each vehicle decodes the spacing signal and a speed signal. The speed signal can be on one of several channels while the spacing single has but one channel. A separate localized third signals specifies which speed channel to track.

The guideways are divided into control segments spanning many miles. For the local loops the control segment may be the length of the guideway in one direction. For the high-speed interconnect guideways, the control segment length will be determined by exit stations and intersections with other guideways. Most segments would be 10-50 miles in length.

When a vehicle is traveling down the guideway it is tracking the spacing signal and decoding the speed signal on the channel specified. On the guideway between control interfaces all the vehicles are on the same channel. When a vehicle reaches its exit point a new speed control channel will be assigned to that vehicle before it leaves the guideway. Each vehicle exiting has its own speed channel assigned by the exit station control system.

Normal operation then tracks the left side rail. When the vehicle is to exit, the exit station point is detected and the right side probe extends to track the right side. Once contact has been established the right side probe takes over steering, power, and signal control duties and the left side probe is retracted partway into the body of the vehicle. Once the vehicle has exited the main guideway the left side probe extends again to make contact with the left side rail and the right side probe is retracted halfway. Steering control again tracks the left side rail. This is done to allow the exit station to "fan out" the vehicles into multiple parking stations. Every time a fan out exit is chosen by the station computer the vehicle shifts from lefts side to right side tracking and back to left side tracking again. The exit and merge functions are the only time right side tracking is done. As soon as the vehicle has gone though the exit area it switches back to left side tracking.

Level 3 Logical Control

Slot-jump is a process to remove empty spaces between vehicles. At high speed it saves energy to have the vehicles follow each other with no empty slots in between vehicles, thus greatly reducing air drag. After a set number of vehicles have formed a chain, the process is halted to leave space for more vehicles to enter the guideway. The number of vehicles in the train is set by a system variable for process tuning.

When the vehicle is traveling at high speed, and senses no immediately trailing or leading vehicles the slot jump process to is started. The next inline station is queried for a vehicle placement map and slot jump instructions. The controlling station acts as a traffic controller to direct vehicles. This electronic map shows the location of each vehicle in the control segment and directs the vehicle to jump forward or backward. The map is then used to locate the closet vehicles an start the slot jump process. The virtual scan window's sync-signal is internally adjusted to cause the vehicle to slow down or speed up by an amount set by an external program variable. The normal speed control process is overridden. If the closest vehicle is behind then the vehicle is to drop back a slot. The value drop in the spacing signal is monitored and as the vehicle slows the value of the spacing signal will eventually start to rise, indicating the leading edge of the next open slot back. The spacing signal value will continue to rise to the peak and then start to fall a second time indicating that the peak has passed and this will end the slot jump process. When the slot jump has ended, the normal speed control process takes over and the vehicle tracks the new slot.

If there are no immediately following or leading vehicles the slot-jump process starts again. This is done until a vehicle is found. If the vehicle now has a vehicle behind it, a communication link is established and the number of vehicles in the chain is incremented. If that number equals or exceeds the system value for maximum chain size, the slot-jump process for chaining vehicles is stopped for that chain. If a vehicle or multiple vehicles exit a train of vehicles leaving an open slot between the vehicles in the train the slot jump process is started to close the gap in the chain. Vehicles will slot jump forward or backward based on the least number of vehicles that need to jump to close the gap. The slot-jump process does not start while a vehicle or a train of vehicles is within the boundaries of a station. Slot jump process can move vehicles forward also. If the vehicle location map indicates no other vehicles are "close by" then the slot jump process is not done. This slot jump process is used on the high speed interstate system only.

A different slot jump process is used on the low speed local area system. This slot jump process does the opposite it brakes up chains to create gaps between vehicles. The low speed guideway does not require chains of vehicles to save energy. It is more important to have open slots for vehicles to merge into, thus reducing merge wait time.

With the foregoing disclosure in mind, it is believed that various adaptations of a transportation system, system components and method, according to the principles of the present invention, will be apparent to those in the art.

The invention claimed is:

1. An automated system for moving passengers and freight across and/or between geographic areas, comprising:
   (a) a U-shaped guideway disposed between two locations comprising:
      (i) a roadway,
      (ii) a vertical inside wall having a longitudinal recess disposed therein,
      (iii) a plurality of rails configured to carry electrical power disposed in the recess, and
      (iv) a plurality of entrance/exit stations, each of which has a server that is configured to communicate with one or more of a plurality of other stations and with a plurality of electric vehicles on the guideway for maintaining speed and spacing between the electric vehicles moving along the guideway wherein the server is configured to transmit control signals to vehicles on the guideway;
   (b) a dual-mode electric vehicle configured to operate on the guideway, each electric vehicle having:
      (i) a plurality of wheel assemblies, one proximal to each corner of the electric vehicle each having a wheel based electrical motor, steering motor and a suspension/levitation system,
      (ii) a battery operatively connected to each electrical motor, steering motor, and suspension/levitation system,
      (iii) a plurality of automated extending/retracting power and steering probes, one disposed on each side proximal to a front of the electric vehicle, operatively connected to the battery, wherein the power and steering probes are adapted to operatively contact the rails of the guideway, and
      (iv) a server operatively connected to the automated retracting power and steering probe having [a.] a receiver process that decodes a control signal into a sync signal component and a spacing signal component, where the difference between the period of the sync and spacing signal components determines the predetermined speed of the vehicles moving along the guideway; and [b.] a signal processor that has a virtual scan window, based on the actual speed of the vehicle, that follows the spacing signal component in a manner such that the relation of a predetermined point in the virtual scan window to the spacing signal component determines whether the vehicle is maintaining the predetermined spacing or whether the speed of the vehicle needs to be adjusted to maintain the predetermined speed and spacing; and (c) wherein the phase of the sync signal component and spacing signal component must remain synced.

2. The automated system of claim 1, wherein the plurality of rails of the guideway are configured to carry electrical power and the control signals along the guideway.

3. The automated system of claim 1, wherein the control signals include digital signals that are transmitted along a guiderail, and placed in circuit communication with a server on a vehicle moving along the guideway, via a sensor on the vehicle that can be placed in circuit communication with the guiderail.

4. The automated system of claim 3, wherein the server on the vehicle is configured to decode the digital signal into the sync signal component and the spacing signal component, and to produce the virtual scan window, based on the actual speed of the vehicle, which is configured to follow the spacing signal component.

5. An automated system for moving passengers and freight across and/or between geographic areas, consisting of:
   (a) a U-shaped guideway disposed between two locations consisting of:
      (i) a roadway,
      (ii) a vertical inside wall having a longitudinal recess disposed therein,
      (iii) a plurality of rails configured to carry electrical power disposed in the recess, and
      (iv) a plurality of entrance/exit stations, each of which has a server that is configured to communicate with one or more of a plurality of other stations and with a plurality of electric vehicles on the guideway for maintaining speed and spacing between the electric vehicles moving along the guideway wherein the server is configured to transmit control signals to vehicles on the guideway;
   (b) a dual-mode electric vehicle configured to operate on the guideway, each electric vehicle having:
      (i) a plurality of wheel assemblies, one proximal to each corner of the electric vehicle each having a wheel based electrical motor, steering motor and a suspension/levitation system,
      (ii) a battery operatively connected to each electrical motor, steering motor, and suspension/levitation system,
      (iii) a plurality of automated extending/retracting power and steering probes, one disposed on each side proximal to a front of the electric vehicle, operatively connected to the battery, wherein the power and steering probes are adapted to operatively contact the rails of the guideway, and
      (iv) a server operatively connected to the automated retracting power and steering probe having a receiver process that decodes a control signal into a sync signal component and a spacing signal component, where the difference between the period of the sync and spacing signal components determines the predetermined speed of the vehicles moving along the guideway; and a signal processor that has a virtual scan window, based on the actual speed of the vehicle, that follows the spacing signal component in a manner such that the relation of a predetermined point in the virtual scan window to the spacing signal component determines whether the vehicle is maintaining the predetermined spacing or whether the speed of the vehicle needs to be adjusted to maintain the predetermined speed and spacing; and (c) wherein the phase of the sync signal component and spacing signal component must remain synced.

* * * * *